US009736129B2

(12) United States Patent
Zhang et al.

(10) Patent No.: US 9,736,129 B2
(45) Date of Patent: Aug. 15, 2017

(54) COUNTER CHECK AND RECONFIGURATION METHOD, APPARATUS, AND SYSTEM

(71) Applicant: Huawei Technologies Co., Ltd., Shenzhen, Guangdong (CN)

(72) Inventors: Tao Zhang, Beijing (CN); Bo Lin, Beijing (CN); Dongmei Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/946,273

(22) Filed: Nov. 19, 2015

(65) Prior Publication Data
US 2016/0080339 A1    Mar. 17, 2016

Related U.S. Application Data

(63) Continuation of application No. 14/603,068, filed on Jan. 22, 2015, now Pat. No. 9,215,700, which is a
(Continued)

(51) Int. Cl.
*H04W 12/04* (2009.01)
*H04L 29/06* (2006.01)
(Continued)

(52) U.S. Cl.
CPC .......... *H04L 63/062* (2013.01); *H04L 9/3226* (2013.01); *H04L 41/0813* (2013.01);
(Continued)

(58) Field of Classification Search
CPC ........ H04W 36/0055; H04W 36/0072; H04W 4/06; H04W 36/08; H04W 74/006;
(Continued)

(56) References Cited

U.S. PATENT DOCUMENTS

| 5,930,186 A | 7/1999 | Iwakiri |
| 7,324,495 B1 | 1/2008 | Gibbons |

(Continued)

FOREIGN PATENT DOCUMENTS

| CN | 101754243 A | 6/2010 |
| CN | 102325005 A | 1/2012 |

(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 v11.1.0, Jun. 2012, 134 pages.

(Continued)

*Primary Examiner* — Quan M Hua

(57) ABSTRACT

The present invention relates to base stations, and a terminal. The primary base station execute the following steps, receiving, by a primary base station, security parameter update request information that is sent by a secondary base station and carries an encryption algorithm, wherein the security parameter update request information comprises the encryption algorithm; adding, by the primary base station, the encryption algorithm in the received security parameter update request information to reconfiguration information; sending, by the primary base station, the reconfiguration information carrying the encryption algorithm to a terminal; and receiving, by the primary base station, reconfiguration complete information sent by the terminal. Thereby, the present invention implements a reconfiguration process in a network architecture in which a primary base station is separated from a secondary base station.

3 Claims, 24 Drawing Sheets

Related U.S. Application Data continuation of application No. PCT/CN2012/079095, filed on Jul. 24, 2012.

(51) Int. Cl.
*H04L 9/32* (2006.01)
*H04W 72/04* (2009.01)
*H04W 12/12* (2009.01)
*H04L 12/24* (2006.01)
*H04W 12/10* (2009.01)
*H04W 24/02* (2009.01)
*H04W 92/10* (2009.01)

(52) U.S. Cl.
CPC ......... *H04L 63/1466* (2013.01); *H04W 12/04* (2013.01); *H04W 12/12* (2013.01); *H04W 72/0406* (2013.01); *H04W 12/10* (2013.01); *H04W 24/02* (2013.01); *H04W 92/10* (2013.01)

(58) Field of Classification Search
CPC ........... H04W 74/0833; H04W 40/248; H04W 48/08; H04W 76/025; H04W 76/027; H04W 76/04; H04B 7/155; H04B 7/024
See application file for complete search history.

(56) References Cited

U.S. PATENT DOCUMENTS

| | | | |
|---|---|---|---|
| 2002/0114308 A1 | 8/2002 | Takano | |
| 2009/0280774 A1* | 11/2009 | Patel | H04L 63/10 455/410 |
| 2010/0056156 A1* | 3/2010 | Xu | H04W 12/04 455/436 |
| 2010/0184447 A1 | 7/2010 | Miki et al. | |
| 2010/0202288 A1 | 8/2010 | Park | |
| 2011/0243077 A1 | 10/2011 | Tazaki | |
| 2012/0100856 A1* | 4/2012 | Ishida | H04W 36/04 455/436 |

FOREIGN PATENT DOCUMENTS

| | | |
|---|---|---|
| JP | 2011-216950 A | 10/2011 |
| KR | 101998033154 A | 7/1998 |
| KR | 20040036118 | 4/2004 |

OTHER PUBLICATIONS

"3rd Generation Partnership Project; Technical Specification Group Radio Access Network; Evolved Universal Terrestrial Radio Access Network (E-UTRAN); Radio Resource Control (RRC); Protocol specification (Release 11)", 3GPP TS 36.331 v11.0.0, Jun. 2012, 302 pages.

"3rd Generation Partnership Project; Technical Specification Group Services and System Aspects; 3GPP System Architecture Evolution (SAE); Security architecture (Release 11)", 3GPP TS 33.401 v11.4.0, Jun. 2012, 121 pages.

"Introduction of Counter Check procedure", Huawei, 3GPP TSG-RAN3 Meeting #84, May 19-23, 2014, 3 pages, R3-141125.

"Introduction of Dual Connectivity", Ericsson, 3GPP TSG-RAN WG3 Meeting #86, Nov. 17-21, 2014, 188 pages, R3-143089.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)", 3GPP TS 36.300 v11.1.0, Mar. 2012, 194 pages.

* cited by examiner

COUNTER CHECK AND RECONFIGURATION METHOD, APPARATUS, AND SYSTEM

CROSS-REFERENCE TO RELATED APPLICATIONS

This application is a continuation of U.S. patent application Ser. No. 14/603,068, filed on Jan. 22, 2015, which is a continuation of International Application No. PCT/CN2012/079095, filed on Jul. 24, 2012. The afore-mentioned patent applications are hereby incorporated by reference in their entireties.

TECHNICAL FIELD

The present invention relates to the communications field, and in particular, to a counter check and reconfiguration method, apparatus, and system.

BACKGROUND

With rapid development of communications technologies, some security-related processes appear in a Long Term Evolution (LTE) network. The processes specifically include a counter check process and a reconfiguration process. The counter check process is mainly that an existing network requires a terminal to check an amount of data sent or received on each data radio bearer (DRB), so as to detect whether an intruder inserts a data packet between the network and the terminal. The reconfiguration process is mainly that the existing network notifies the terminal of a security algorithm to be used, so as to trigger an update of an algorithm and a key of the terminal. Each DRB is a radio bearer that is established according to a service requirement of a user, and used to transmit data of the user.

In the prior art, the counter check process and reconfiguration process are jointly completed by a base station and a terminal. When a counter check is required, the base station sends counter check information to the terminal, where the information includes an identity of a DRB. According to the identity of the DRB, the terminal compares first 25 bits of an uplink count value of the DRB with first 25 bits of an uplink count value of a corresponding DRB maintained by the terminal itself; and compares first 25 bits of a downlink count value of the DRB with first 25 bits of a downlink count value of the corresponding DRB maintained by the terminal itself. When at least one result of the results of the two comparisons is different, the terminal sends counter check response information to the base station. When a reconfiguration is required, the base station sends reconfiguration information to the terminal. The terminal communicates with the base station according to a security algorithm in the reconfiguration information, and sends reconfiguration complete information to the base station.

However, the counter check process and reconfiguration process in the prior art are not applicable to a new network architecture. In the new network architecture, a base station that maintains a count value is different from a base station that executes a counter check process. In addition, a base station that performs is secure communication with a terminal is also different from a base station that executes a reconfiguration process. The base station that maintains the count value is a secondary base station. The base station that executes the counter check process is a primary base station. The base station that actually performs secure communication with the terminal is the secondary base station. The base station that executes the reconfiguration process is the primary base station. If the counter check process in the prior art is applied to the new network architecture, the primary base station cannot execute the counter check process because count-related information cannot be obtained. If the reconfiguration process in the prior art is applied to the new network architecture, the secondary base station cannot perform normal communication with the terminal because security-related information cannot be obtained.

SUMMARY

Embodiments of the present invention provide a counter check and reconfiguration method, apparatus, and system, applied to a network architecture in which a primary base station is separated from a secondary base station to solve a problem that a counter check process and a reconfiguration process cannot be implemented in the network architecture, thereby implementing the counter check process and reconfiguration process in the network architecture in which the primary base station is separated from the secondary base station.

According to a first aspect, an embodiment of the present invention provides a counter check method, where the method includes: receiving first identity information and first count information sent by a secondary base station; querying, according to the first identity information, second identity information corresponding to the first identity information; extracting second count information from the first count information; sending the second identity information and the second count information to a terminal, so that the terminal compares, according to the second identity information, the second count information with third count information maintained by the terminal itself to obtain first comparison result information or second comparison result information; receiving the first comparison result information sent by the terminal, or the second identity information and second comparison result information sent by the terminal; and determining counter check result information according to the received first comparison result information, or the received second identity information and second comparison result information.

According to a second aspect, an embodiment of the present invention provides a counter check method, where the method includes: receiving second identity information corresponding to first identity information and second count information extracted from first count information, which are sent by a primary base station; comparing, according to the second identity information, the second count information with third count information maintained locally to obtain first comparison result information or second comparison result information; and sending the first comparison result information, or the second identity information and second comparison result information to the primary base station, so that the primary base station determines the counter check result information according to the first comparison result information or the second comparison result information.

According to a third aspect, an embodiment of the present invention provides a counter check method, where the method includes: sending first identity information and first count information to a terminal, so that the terminal compares, according to the first identity information, the first count information with second count information maintained by the terminal itself to obtain first comparison result information or second comparison result information;

receiving the first comparison result information sent by the terminal, or the first identity information and the second comparison result information sent by the terminal; querying, according to the first identity information, second identity information corresponding to the first identity information; and sending the first comparison result information or the second comparison result information to a secondary base station, so that the secondary base station determines the counter check result information, thereby obtaining the second count information maintained by the terminal itself.

According to a fourth aspect, an embodiment of the present invention provides a counter check method, where the method includes: receiving first identity information and first count information, which are sent by a primary base station; comparing, according to the first identity information, the first count information with second count information maintained locally to obtain first comparison result information or second comparison result information; and sending the first comparison result information, or the first identity information and second comparison result information to the primary base station, so that the primary base station forwards the first identity information and second comparison result information to a secondary base station, so that the secondary base station obtains the second count information maintained by the terminal and compares the second count information with third count information maintained by the secondary base station itself, thereby determining counter check result information.

According to a fifth aspect, an embodiment of the present invention provides a reconfiguration method, where the method includes: determining an encryption algorithm according to a security capability of a terminal; sending reconfiguration information carrying the encryption algorithm to the terminal, so that the terminal updates a key of the terminal itself according to the encryption algorithm in the reconfiguration information and communicates with a secondary base station by using the updated key; and receiving reconfiguration complete information sent by the terminal.

According to a sixth aspect, an embodiment of the present invention provides a reconfiguration method, where the method includes: receiving reconfiguration information that is sent by a primary base station and carries an encryption algorithm; updating a local key according to the encryption algorithm in the reconfiguration information and using the encryption algorithm and the updated key to communicate with a secondary base station; and sending reconfiguration complete information to the primary base station, so that the primary base station knows, according to the reconfiguration complete information, that the terminal completes a reconfiguration.

According to a seventh aspect, an embodiment of the present invention provides a reconfiguration method, where the method includes: receiving security parameter update request information that is sent by a secondary base station and carries an encryption algorithm, where the security parameter update request information includes the encryption algorithm, or the encryption algorithm and security parameter update request cause information; adding the encryption algorithm in the received security parameter update request information to reconfiguration information; sending the reconfiguration information carrying the encryption algorithm to a terminal, so that the terminal updates a key of the terminal itself according to the encryption algorithm in the reconfiguration information and communicates with the secondary base station by using the encryption algorithm and the updated key; and receiving reconfiguration complete information sent by the terminal.

According to an eighth aspect, an embodiment of the present invention provides a reconfiguration method, where the method includes: receiving reconfiguration information that is sent by a primary base station and carries an encryption algorithm; updating a local key according to the encryption algorithm in the reconfiguration information and using the encryption algorithm and the updated key to communicate with a secondary base station; and sending reconfiguration complete information to the primary base station.

According to a ninth aspect, an embodiment of the present invention provides a counter check apparatus, where the apparatus includes: a first receiving unit, configured to receive first identity information and first count information sent by a secondary base station, and transmit the first identity information to a querying unit, and transmit the first count information to an extracting unit; the querying unit, configured to receive the first identity information from the first receiving unit, query, according to the first identity information, second identity information corresponding to the first identity information, and transmit the second identity information to a sending unit; the extracting unit, configured to receive the first count information from the first receiving unit, and extract second count information from the first count information, and transmit the second count information to the sending unit; the first sending unit, configured to receive the second identity information from the querying unit, and receive the second count information from the extracting unit, and send the second identity information and the second count information to a terminal, so that the terminal compares, according to the second identity information, the second count information with third count information maintained by the terminal itself to obtain first comparison result information or second comparison result information; a second receiving unit, configured to receive the first comparison result information sent by the terminal, or the second identity information and second comparison result information sent by the terminal, and transmit the first comparison result information, or the second identity information and second comparison result information to a deteimining unit; and the determining unit, configured to receive the first comparison result information, or the second identity information and second comparison result information from the second receiving unit, and determine the counter check result information according to the received first comparison result information, or the received second identity information and second comparison result information.

According to a tenth aspect, an embodiment of the present invention provides a counter check apparatus, where the apparatus includes: a receiving unit, configured to receive second identity information corresponding to first identity information and second count information extracted from first count information, which are sent by a primary base station, and transmit the second identity information to a comparing unit and a sending unit, and transmit the second count information to the comparing unit; the comparing unit, configured to receive the second identity information and the second count information from the receiving unit, and compare, according to the second identity information, the second count information with third count information maintained locally to obtain first comparison result information or second comparison result information, and transmit the first comparison result information or the second comparison result information to the sending unit; and the sending unit, configured to receive the second identity information from the receiving unit, and receive the first comparison result information or the second comparison result information from the comparing unit, and send the first comparison result information, or the second identity information and second comparison result information to the primary base station, so that the primary base station determines the counter check result information according to the first comparison result information or the second comparison result information.

According to an eleventh aspect, an embodiment of the present invention provides a counter check apparatus, where the apparatus includes: a first sending unit, configured to send first identity information and first count information to a terminal, so that the terminal compares, according to the first identity information, the first count information with second count information maintained by the terminal itself to obtain first comparison result information or second comparison result information; a receiving unit, configured to receive the first comparison result information sent by the terminal, or the first identity information and second comparison result information sent by the terminal, and transmit the first identity information to a querying unit, and transmit the first comparison result information or the second comparison result information to a sending unit; the querying unit, configured to receive the first identity information from the receiving unit, query, according to the first identity information, second identity information corresponding to the first identity information, and transmit the second identity information to the sending unit; and the second sending unit, configured to receive the second identity information from the querying unit, and receive the first comparison result information or the second comparison result information from the receiving unit, and send the first comparison result information, or the second identity information and the second comparison result information to a secondary base station, so that the secondary base station determines the counter check result information, thereby obtaining the second count information maintained by the terminal itself.

According to a twelfth aspect, an embodiment of the present invention provides a counter check apparatus, where the apparatus includes: a receiving unit, configured to receive first identity information and first count information sent by a primary base station, and transmit the first identity information to a comparing unit and a sending unit, and transmit the first count information to the querying or comparing unit; the querying or comparing unit, configured to receive the first identity information and the first count information from the receiving unit, compare, according to the first identity information, the first count information with second count information maintained locally to obtain first comparison result information or second comparison result information, and transmit the second count information, or the first comparison result information, or the second comparison result information to the sending unit; and the sending unit, configured to receive the first identity information from the receiving unit, and receive the first comparison result information or the second comparison result information from the comparing unit, and send the first comparison result information, or the first identity information and second comparison result information to the primary base station, so that the primary base station forwards the first identity information and the second comparison result information to a secondary base station, and then the secondary base station obtains the second count information maintained by the terminal and compares the second count information with third count information maintained by the secondary base station itself, thereby determining counter check result information.

According to a thirteenth aspect, an embodiment of the present invention provides a reconfiguration apparatus, where the apparatus includes: a determining unit, configured to determine an encryption algorithm according to a security capability of a terminal, and transmit the encryption algorithm to a first sending unit and a second sending unit; the first sending unit, configured to receive the encryption algorithm from the determining unit, and send reconfiguration information carrying the encryption algorithm to a terminal, so that the terminal updates a key of the terminal itself according to the encryption algorithm in the reconfiguration information and communicates with a secondary base station by using the updated key; and a first receiving unit, configured to receive reconfiguration complete information sent by the terminal.

According to a fourteenth aspect, an embodiment of the present invention provides a reconfiguration apparatus, where the apparatus includes: a receiving unit, configured to receive reconfiguration information that is sent by a primary base station and carries an encryption algorithm, and transmit the reconfiguration information carrying the encryption algorithm to an updating unit; the updating unit, configured to receive the reconfiguration information carrying the encryption algorithm from the receiving unit, update a local key according to the encryption algorithm in the reconfiguration information and use the encryption algorithm and the updated key to communicate with a secondary base station, and transmit the updated key information to the sending unit; and the sending unit, configured to receive the updated key information from the updating unit, and send reconfiguration complete information to the primary base station, so that the primary base station knows, according to the reconfiguration complete information, that the terminal completes a reconfiguration.

According to a fifteenth aspect, an embodiment of the present invention provides a reconfiguration apparatus, where the apparatus includes: a first receiving unit, configured to receive security parameter update request information that is sent by a secondary base station and carries an encryption algorithm, and transmit the security parameter update request information carrying the encryption algorithm to an adding unit, where the security parameter update request information includes the encryption algorithm, or the encryption algorithm and security parameter update request cause information; the adding unit, configured to receive the security parameter update request information carrying the encryption algorithm from the first receiving unit, add the encryption algorithm in the received security parameter update request information to reconfiguration information, and transmit the reconfiguration information to a first sending unit; the first sending unit, configured to receive the reconfiguration information carrying the encryption algorithm from the adding unit, and send the reconfiguration information carrying the encryption algorithm to a terminal, so that the terminal updates a key of the terminal itself according to the encryption algorithm in the reconfiguration information and communicates with the secondary base station by using the updated key; and a second receiving unit, configured to receive reconfiguration complete information sent by the terminal.

According to a sixteenth aspect, an embodiment of the present invention provides a reconfiguration apparatus, where the apparatus includes: a receiving unit, configured to receive reconfiguration information that is sent by a primary base station and carries an encryption algorithm, and transmit the reconfiguration information carrying the encryption algorithm to a updating unit; the updating unit, configured to receive the reconfiguration information carrying the encryption algorithm from the receiving unit, update a local key according to the encryption algorithm in the reconfiguration information and use the encryption algorithm and the updated key to communicate with a secondary base station, and transmit the updated key information to the sending unit; and the sending unit, configured to receive the updated key information from the updating unit, and send reconfiguration complete information to the primary base station, so that the primary base station knows, according to the reconfiguration complete information, information that the primary base station completes a reconfiguration.

According to a seventeenth aspect, an embodiment of the present invention provides a counter check and reconfiguration system, where the system includes: a counter check apparatus and a secondary base station and/or a reconfiguration apparatus, each according to various embodiment(s) described herein.

According to an eighteenth aspect, an embodiment of the present invention provides a primary base station, where the primary base station includes: a receiver, configured to receive first identity information and first count information sent by a secondary base station, and transmit the first identity information and the first count information to a first processor; and further configured to receive first comparison result information, or second identity information and second comparison result information sent by a terminal, and transmit the first identity information and the first count information, the first comparison result information, or the second identity information and second comparison result information to the processor; the processor, configured to receive the first identity information and the first count information from the receiver, query, according to the first identity information, second identity information corresponding to the first identity information, and meanwhile extract second count information from the first count information, and transmit the second identity information and the second count information to a transmitter; and further configured to receive the first comparison result information, or the second identity information and second comparison result information from the receiver, and determine the counter check result information according to the received first comparison result information, or the received second identity information and second comparison result information; and the transmitter, configured to receive the second identity information and the second count information from the processor, and send the second identity information and the second count information to the terminal, so that the terminal compares, according to the second identity information, the second count information with third count information maintained by the terminal itself to obtain the first comparison result information or the second comparison result information.

According to a nineteenth aspect, an embodiment of the present invention provides a terminal, where the terminal includes: a receiver, configured to receive second identity information corresponding to first identity information and second count information extracted from first count information, which are sent by a primary base station, and transmit the second identity information to a comparing unit and a sending unit, and transmit the second count information to the processor; the processor, configured to receive the second identity information and the second count information from the receiver, and compare, according to the second identity information, the second count information with third count information maintained locally to obtain first comparison result information or second comparison result information, and transmit the first comparison result information or the second comparison result information to the transmitter; and the transmitter, configured to receive the second identity information from the receiver, and receive the first comparison result information or the second comparison result information from the comparing unit, and send the first comparison result information, or the second identity information and second comparison result information to the primary base station, so that the primary base station determines the counter check result information according to the first comparison result information or the second comparison result information.

According to a twentieth aspect, an embodiment of the present invention provides a primary base station, where the primary base station includes: a transmitter, configured to send first identity information and first count information to a terminal, so that the terminal compares, according to the first identity information, the first count information with second count information maintained by the terminal itself to obtain first comparison result information or second comparison result information; and further configured to receive second identity information from a processor, and the first comparison result information or the second comparison result information, and send first comparison result information, or the second identity information and the second comparison result information to a secondary base station, so that the secondary base station determines the counter check result information, thereby obtaining the second count information maintained by the terminal itself; a receiver, configured to receive the first comparison result information sent by the terminal, or the first identity information and second comparison result information sent by the terminal, and transmit the first identity information to the processor, and transmit the first comparison result information or the second comparison result information to the transmitter; and the processor, configured to receive the first identity information from the receiver, query, according to the first identity information, the second identity information corresponding to the first identity information, and transmit the second identity information to the transmitter.

According to a twenty-first aspect, an embodiment of the present invention provides a terminal, where the terminal includes: a receiver, configured to receive first identity information and first count information, which are sent by a primary base station, and transmit the first identity information to a processor and a transmitter, and transmit the first count information to the processor; the processor, configured to receive the first identity information and the first count information from the receiver, compare, according to the first identity information, the first count information with second count information maintained locally to obtain first comparison result information or second comparison result information, and transmit the first identity information; and the transmitter, configured to receive the first identity information from the receiver, and receive the first comparison result information or the second comparison result information from the processor, and send the first comparison result information, or the first identity information and second comparison result information to the primary base station, so that the primary base station sends the first identity information and the second comparison result information to a secondary base station, and then the secondary base station obtains the second count information maintained by the terminal and compares the second count information with third count information maintained by the secondary base station itself, thereby determining counter check result information.

According to a twenty-second aspect, an embodiment of the present invention provides a primary base station, where the primary base station includes: a processor, configured to determine an encryption algorithm according to a security capability of a terminal, and transmit the encryption algorithm to a transmitter; the transmitter, configured to receive the encryption algorithm from the processor, and send reconfiguration information carrying the encryption algorithm to the terminal, so that the terminal updates a key of the terminal itself according to the encryption algorithm in the reconfiguration information and communicates with a secondary base station by using the updated key; and a receiver, configured to receive reconfiguration complete information sent by the terminal.

According to a twenty-third aspect, an embodiment of the present invention provides a terminal, where the terminal includes: a receiver, configured to receive reconfiguration information that is sent by a primary base station and carries an encryption algorithm, and transmit the reconfiguration information carrying the encryption algorithm to a processor; the processor, configured to receive the reconfiguration information carrying the encryption algorithm from the receiver, update a local key according to the encryption algorithm in the reconfiguration information and use the encryption algorithm and the updated key to communicate with a secondary base station, and transmit the updated key information to the transmitter; and the transmitter, configured to receive the updated key information from the updating unit, and send reconfiguration complete information to the primary base station, so that the primary base station knows, according to the reconfiguration complete information, that the terminal completes a reconfiguration.

According to a twenty-fourth aspect, an embodiment of the present invention provides a primary base station, where the primary base station includes: a receiver, configured to receive security parameter update request information that is sent by a secondary base station and carries an encryption algorithm, and transmit the security parameter update request information carrying the encryption algorithm to a processor; and further configured to receive reconfiguration complete information sent by the terminal, where the security parameter update request information includes the encryption algorithm, or the encryption algorithm and security parameter update request cause information; and a forwarder, configured to receive the reconfiguration information carrying the encryption algorithm from the receiver, and forward the reconfiguration information carrying the encryption algorithm to the terminal, so that the terminal updates a key of the terminal itself according to the encryption algorithm in the reconfiguration information and communicates with a secondary base station by using the updated key.

According to a twenty-fifth aspect, an embodiment of the present invention provides a terminal, where the terminal includes: a receiver, configured to receive reconfiguration information that is sent by a primary base station and carries an encryption algorithm, and transmit the reconfiguration information carrying the encryption algorithm to the processor; the processor, configured to receive the reconfiguration information carrying the encryption algorithm from the receiver, update a local key according to the encryption algorithm in the reconfiguration information and use the encryption algorithm and the updated key to communicate with a secondary base station, and transmit the updated key information to the transmitter; and the transmitter, configured to receive the updated key information from the updating unit, and send reconfiguration complete information to the primary base station, so that the primary base station knows, according to the reconfiguration complete information, information that the primary base station completes a reconfiguration.

According to a twenty-sixth aspect, an embodiment of the present invention provides a counter check and reconfiguration system, where the system includes: a primary base station and a secondary base station and/or a terminal, each according to various embodiment(s) described herein.

By applying the foregoing solutions, embodiments of the present invention implement a counter check process and a reconfiguration process in a network architecture in which a primary base station is separated from a secondary base station.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
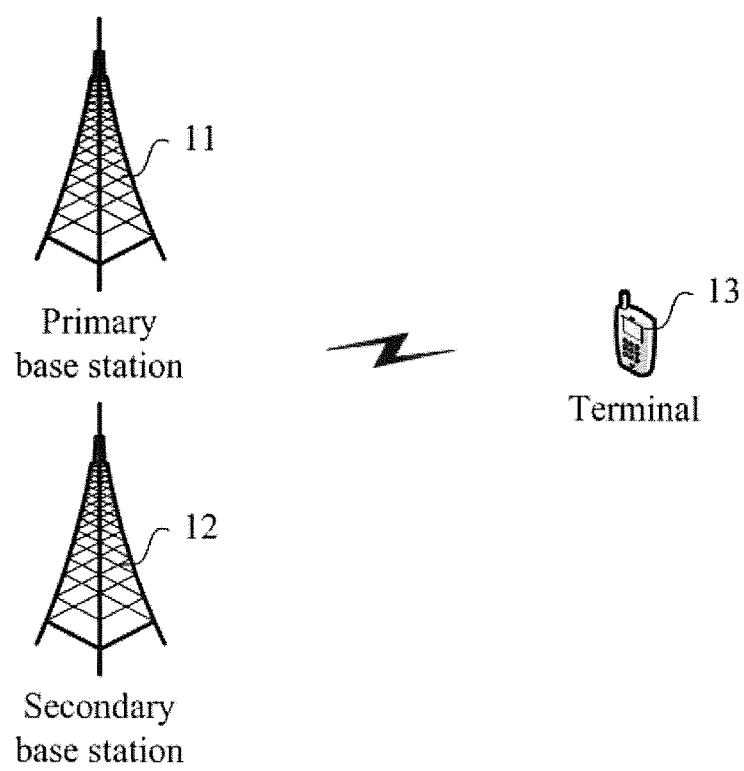
FIG. 1 is a network architecture diagram of a counter check and reconfiguration system according to Embodiment 1 of the present invention.

FIG. 1 is an architecture diagram of a counter check and reconfiguration system according to Embodiment 1 of the present invention. As shown in the figure, the counter check and reconfiguration system provided by the embodiment of the present invention specifically includes: a primary base station 11, a secondary base station 12, and a terminal 13.

In the system, the primary base station 11 is configured to execute a counter check process, and ask the terminal 13 to check an amount of data sent or received over each DRB, so as to detect whether an intruder inserts a data packet between the primary base station 11 and the terminal 13, and the secondary base station 12 is configured to maintain a count value. In addition, the primary base station 11 is configured to execute a reconfiguration process, and notify the terminal 13 of a security algorithm to be used, thereby triggering an update of an algorithm and a key of the terminal, and the secondary base station 12 is configured to perform secure communication with the terminal 13.

Figure 2:
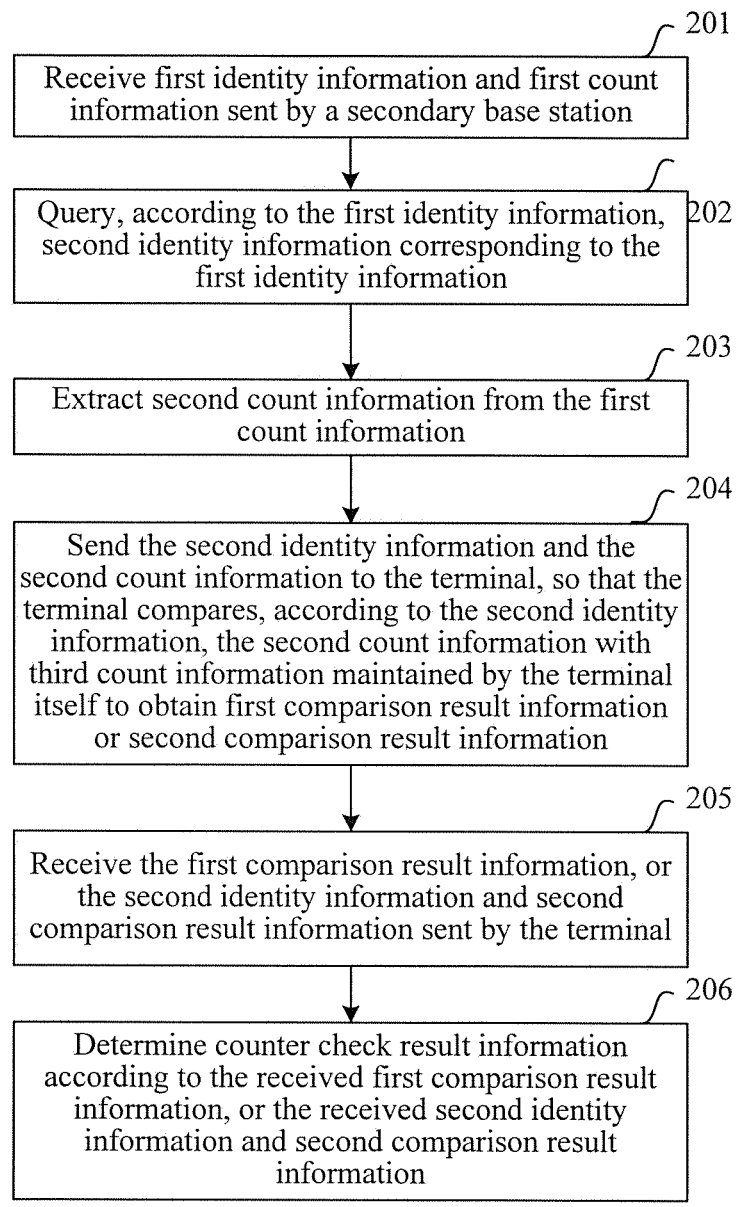
FIG. 2 is a flowchart of a counter check method according to Embodiment 2 of the present invention.

FIG. 2 is a flowchart of a counter check method according to Embodiment 2 of the present invention. As shown in the figure, the embodiment of the present invention specifically includes the following steps:

Step 201: A primary base station receives first identity information and first count information sent by a secondary base station.

Specifically, the first identity information includes an identity of a terminal and a radio access bearer E-RAB identity of the terminal; the first count information includes a first uplink count value and a first downlink count value of the E-RAB identity of the terminal, or first n bits of a first uplink count value and first n bits of a first downlink count value of the E-RAB identity of the terminal, where n is a user-defined numeric value.

Step 202: The primary base station queries, according to the first identity information, second identity information corresponding to the first identity information.

Specifically, a DRB identity of the terminal and corresponding to the E-RAB identity is queried according to the identity of the terminal and the radio access bearer E-RAB identity of the terminal, where the DRB identity of the terminal is the second identity information. A connection between the primary base station and the terminal may bear multiple DRBs, and a connection between the primary base station and a core network may bear multiple E-RABs. For a same terminal, each E-RAB is corresponding to a unique DRB. Therefore, the DRB identity of the terminal may be determined uniquely according to the identity of the terminal and the radio access bearer E-RAB identity of the terminal.

Step 203: The primary base station extracts second count information from the first count information. First several bits of the first uplink count value are extracted from the first count information for use as a second uplink count value, and first several bits of the first downlink count value are extracted from the first count information for use as a second downlink count value, where the second uplink count value and the second downlink count value constitute the second count information.

Specifically, if the first count information includes the first uplink count value and first downlink count value of the E-RAB identity of the terminal, first m bits of the first uplink count value and first m bits of the first downlink count value of the E-RAB identity of the terminal are extracted as the second uplink count value and the second downlink count value respectively, where the second uplink count value and the second downlink count value are the second count information, and m is a user-defined numeric value.

If the first count information includes the first n bits of the first uplink count value and first n bits of the first downlink count value of the E-RAB identity of the terminal, first m bits of the first uplink count value and first m bits of the first downlink count value of the E-RAB identity of the terminal are extracted as the second uplink count value and the second downlink count value respectively, where the second uplink count value and the second downlink count value are the second count information, and m is a user-defined numeric value, and m is less than or equal to n.

Step 204: The primary base station sends the second identity information and the second count information to the terminal, so that the terminal compares, according to the second identity information, the second count information with third count information maintained by the terminal itself to obtain first comparison result information or second comparison result information. According to the second identity information, the terminal makes a first comparison between the second uplink count value and a third uplink count value that is maintained by the terminal itself and corresponding to the second identity information, and/or makes a second comparison between the second downlink count value and a third downlink count value that is maintained by the terminal itself and corresponding to the second identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the third count information maintained by the terminal itself, and the third count information maintained by the terminal itself includes the third uplink count value and the third downlink count value.

Specifically, a process in which the terminal compares, according to the second identity information, the second count information with the third count information maintained by the terminal itself to obtain the first comparison result information or second comparison result information, may be further in the following three comparison manners:

1. According to the second identity information, the terminal makes a first comparison between the second uplink count value and the third uplink count value that is maintained by the terminal itself and corresponding to the second identity information; when a comparison result of the first comparison is same, the terminal makes a second comparison between the second downlink count value and the third downlink count value that is maintained by the terminal itself and corresponding to the second identity information; when a comparison result of the second comparison is also the same, the terminal obtains the first comparison result information. The first comparison result information is null information.

When the comparison result of the first comparison is different, it is unnecessary to make a second comparison between the second downlink count value and the third downlink count value that is maintained by the terminal itself and corresponding to the second identity information, and the second comparison result information is obtained directly. The second comparison result information is the third count information maintained by the terminal itself; the third count information maintained by the terminal itself includes the third uplink count value and the third downlink count value.

When the comparison result of the first comparison is same, but the comparison result of the second comparison is different, the second comparison result information is also obtained.

2. According to the second identity information, the terminal makes a second comparison between the second downlink count value and the third downlink count value that is maintained by the terminal itself and corresponding to the second identity information. When a comparison result of the second comparison is same, the terminal makes a first comparison between the second uplink count value and the third uplink count value that is maintained by the terminal itself and corresponding to the second identity information. The rest is the same as the foregoing comparison process, and is not repeated herein.

3. According to the second identity information, the terminal makes a first comparison between the second uplink count value and the third uplink count value that is maintained by the terminal itself and corresponding to the second identity information, and makes a second comparison between the second downlink count value and a third downlink count value that is maintained by the terminal itself and corresponding to the second identity information. When a comparison result of the first comparison is same, and a comparison result of the second comparison is same, the first comparison result information is obtained; or when a comparison result of the first comparison is different, and/or a comparison result of the second comparison is different, the second comparison result information is obtained. The first comparison result information is null information, the second comparison result information is the third count information maintained by the terminal itself, and the third count information maintained by the terminal itself includes the third uplink count value and the third downlink count value.

If the second uplink count value and the second downlink count value are of m bits, according to the DRB identity of the second identity information, the terminal queries the third count information maintained by the terminal itself, separately extracts first m bits of the third uplink count value and first m bits of the third downlink count value from the third count information, and then makes a first comparison between the m-bit second uplink count value and the m-bit third uplink count value, and/or makes a second comparison between the m-bit second downlink count value and the m-bit third downlink count value.

When the m-bit second uplink count value is the same as the m-bit third uplink count value, and the m-bit second downlink count value is also the same as the m-bit third downlink count value, it indicates that the first count information of the secondary base station is the same as the third count information maintained by the terminal itself, and it also indicates that quantities of data packets sent and received and corresponding to the DRB identity are the same on the secondary base station and the terminal. Therefore, no intruder inserts a data packet between the secondary base station and the terminal. In this case, information fed back to the primary base station is null information, namely, the first comparison result information.

When the m-bit second uplink count value is different from the m-bit third uplink count value, and/or the m-bit second downlink count value is also different from the m-bit third downlink count value, it indicates that the first count information of the secondary base station is different from the third count information maintained by the terminal itself, and it also indicates that an amount of data packets sent and/or received and corresponding to the DRB identity are different on the secondary base station and terminal. Therefore, it is possible that an intruder inserts a data packet between the secondary base station and the terminal. In this case, information fed back to the primary base station is the third count information maintained by the terminal itself, namely, the second comparison result information.

Step 205: The primary base station receives the first comparison result information sent by the terminal, or the second identity information and second comparison result information sent by the terminal. The second identity information is the DRB identity, the first comparison result information is null information, and the second comparison result information is the third count information maintained by the terminal itself.

Specifically, when the m-bit second uplink count value is the same as the m-bit third uplink count value, and the m-bit second downlink count value is also the same as the m-bit third downlink count value, the primary base station receives the DRB identity and null information sent by the terminal.

When the m-bit second uplink count value is different from the m-bit third uplink count value, and/or the m-bit second downlink count value is different from the m-bit third downlink count value, the primary base station receives the DRB identity sent by the terminal and the third count information maintained by the terminal itself.

Step 206: The primary base station determines counter check result information according to the received first comparison result information, or the received second identity information and second comparison result information.

Specifically, when the first comparison result information is received, it is determined that the counter check result information is that the first count information is consistent with the third count information; when the second comparison result information is received, it is determined that the counter check result information is that the first count information is inconsistent with the third count information.

Figure 3:
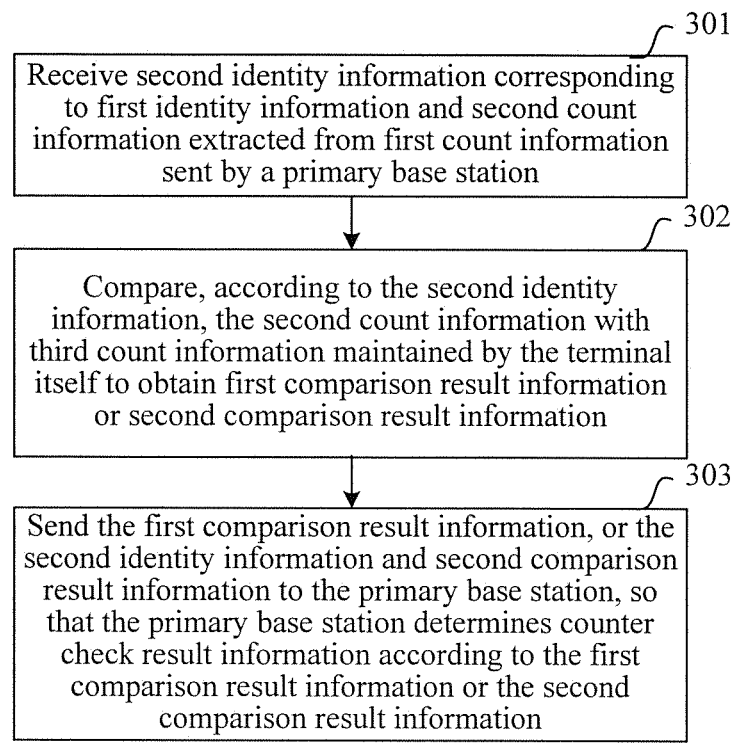
FIG. 3 is a flowchart of a counter check method according to Embodiment 3 of the present invention.

FIG. 3 is a flowchart of a counter check method according to Embodiment 3 of the present invention. As shown in the figure, the embodiment of the present invention specifically includes the following steps:

Step 301: A terminal receives second identity information corresponding to first identity information and second count information extracted from first count information sent by a primary base station.

Specifically, the primary base station determines the second identity information and second count information according to the first identity information and first count information received from a secondary base station. The first identity information includes an identity of the terminal and a radio access bearer E-RAB identity of the terminal; the first count information includes a first uplink count value and a first downlink count value of the E-RAB identity of the terminal, or first n bits of a first uplink count value and first n bits of a first downlink count value of the E-RAB identity of the terminal.

In addition, a specific process in which the primary base station determines the second identity information and second count information according to the first identity information and first count information received from the secondary base station, is as follows:

A DRB identity of the terminal and corresponding to the E-RAB identity is queried according to the identity of the terminal and the radio access bearer E-RAB identity of the terminal, where the DRB identity of the terminal is the second identity information.

If the first count information includes the first uplink count value and first downlink count value of the E-RAB identity of the terminal, first m bits of the first uplink count value and first m bits of the first downlink count value of the E-RAB identity of the terminal are extracted as a second uplink count value and a second downlink count value respectively, where the second uplink count value and the second downlink count value are the second count information, and m is a user-defined numeric value.

If the first count information includes the first n bits of the first uplink count value and first n bits of the first downlink count value of the E-RAB identity of the terminal, first m bits of the first uplink count value and first m bits of the first downlink count value of the E-RAB identity of the terminal are extracted as the second uplink count value and the second downlink count value respectively, where the second uplink count value and the second downlink count value are the second count information, and m is a user-defined numeric value, and m is less than or equal to n.

Step 302: The terminal compares, according to the second identity information, the second count information with third count information maintained by the terminal itself to obtain first comparison result information or second comparison result information.

Specifically, a specific comparison process of step 302 is the same as that of step 204, and is not further described in detail herein.

According to the second identity information, the terminal makes a first comparison between the second uplink count value and a third uplink count value that is maintained by the terminal itself and corresponding to the second identity information, and/or makes a second comparison between the second downlink count value and a third downlink count value that is maintained by the terminal itself and corresponding to the second identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the third count information maintained by the terminal itself, and the third count information maintained by the terminal itself includes the third uplink count value and the third downlink count value.

If the second uplink count value and the second downlink count value are of m bits, according to the DRB identity of the second identity information, the terminal queries the third count information maintained by the terminal itself, separately extracts first m bits of the third uplink count value and first m bits of the third downlink count value from the third count information, then makes a first comparison between the m-bit second uplink count value and the m-bit third uplink count value, and meanwhile makes a second comparison between the m-bit second downlink count value and the m-bit third downlink count value.

When the m-bit second uplink count value is the same as the m-bit third uplink count value, and the m-bit second downlink count value is also the same as the m-bit third downlink count value, it indicates that the first count information of the secondary base station is the same as the third count information maintained by the terminal itself, and it also indicates that an amount of data sent or received and corresponding to the DRB identity is the same on the primary base station and the terminal. Therefore, no intruder inserts a data packet between the primary base station and the terminal. In this case, information fed back to the primary base station is null information, namely, the first comparison result information.

When the m-bit second uplink count value is different from the m-bit third uplink count value, and/or the m-bit second downlink count value is also different from the m-bit third downlink count value, it indicates that the first count information of the secondary base station is different from the third count information maintained by the terminal itself, and it also indicates that an amount of data sent or received and corresponding to the DRB identity is the same between the primary base station and the terminal. Therefore, no intruder inserts a data packet between the primary base station and the terminal. In this case, information fed back to the primary base station is the third count information maintained by the terminal itself, namely, the second comparison result information.

Step 303: The terminal sends the first comparison result information, or the second identity information and second comparison result information to the primary base station, so that the primary base station determines counter check result information according to the first comparison result information or the second comparison result information. The second identity information is the DRB identity, the first comparison result information is null information, and the second comparison result information is the third count information maintained by the terminal itself.

Specifically, when the m-bit second uplink count value is the same as the m-bit third uplink count value, and the m-bit second downlink count value is also the same as the m-bit third downlink count value, the primary base station receives the DRB identity and null information sent by the terminal.

When the m-bit second uplink count value is different from the m-bit third uplink count value, and/or the m-bit second downlink count value is also different from the m-bit third downlink count value, the primary base station receives the DRB identity sent by the terminal and the third count information maintained by the terminal itself.

Figure 4:
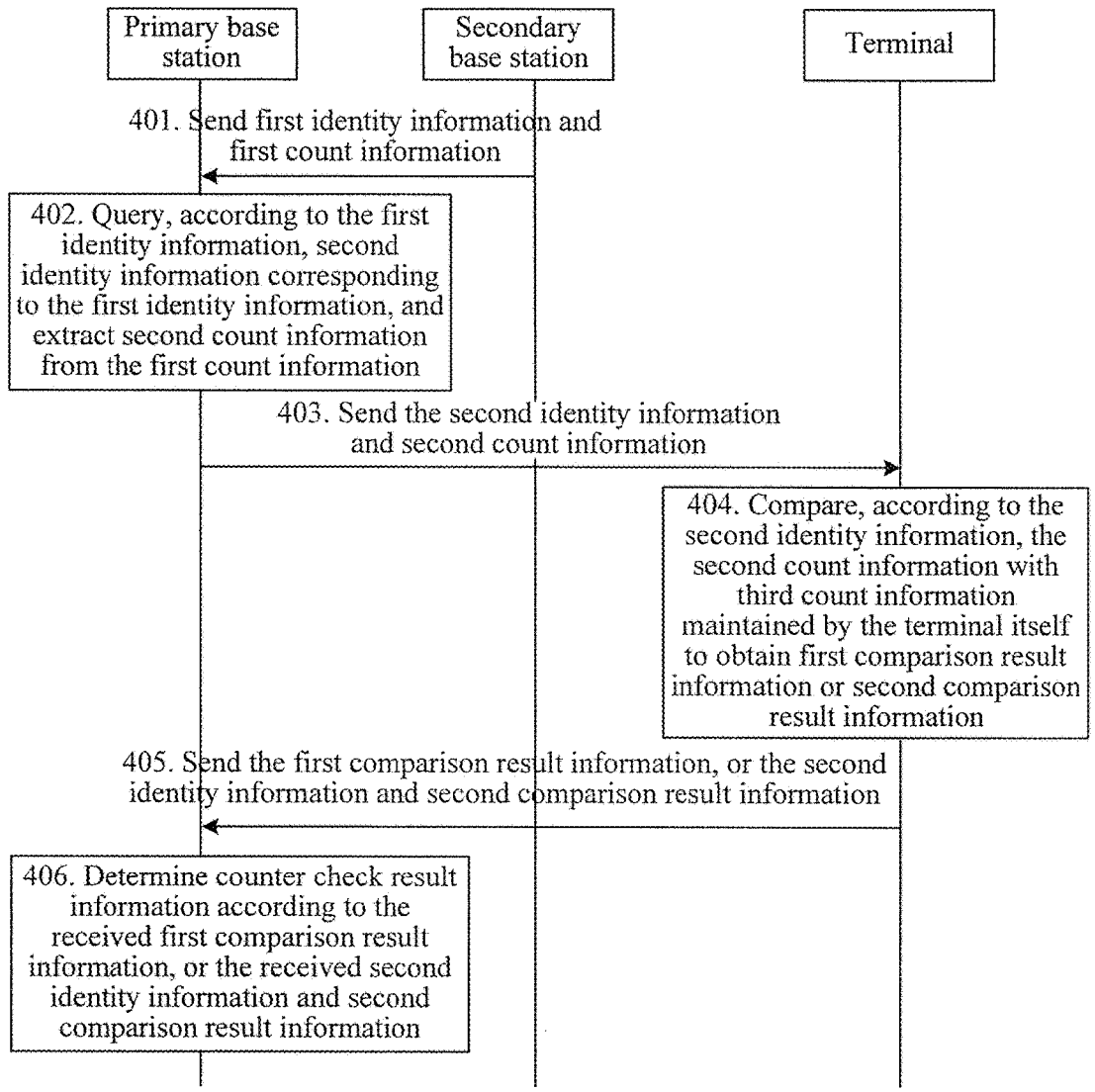
FIG. 4 is an information interaction diagram of a counter check method according to Embodiment 4 of the present invention.

FIG. 4 is an information interaction diagram of a counter check method according to Embodiment 4 of the present invention. As shown in the figure, the embodiment of the present invention specifically includes the following steps:

Step 401: A secondary base station sends first identity information and first count information to a primary base station. This step is the same as step 201, and is not further described in detail herein.

Step 402: The primary base station queries, according to the first identity information, second identity information corresponding to the first identity information, and extracts second count information from the first count information. This step includes content of step 202 and step 203, and is not further described in detail herein.

Step 403: The primary base station sends the second identity information and second count information to a ten final. This step is the same as step 204, and is not further described in detail herein.

Step 404: The terminal compares, according to the second identity information, the second count information with third count information maintained by the terminal itself to obtain first comparison result information or second comparison result information. This step is the same as step 302, and is not further described in detail herein.

Step 405: The terminal sends the first comparison result information, or the second identity information and second comparison result information to the primary base station. This step is the same as step 303, and is not further described in detail herein.

Step 406: The primary base station determines counter check result information according to the received first comparison result information, or the received second identity information and second comparison result information. This step is the same as step 206, and is not further described in detail herein.

Figure 5:
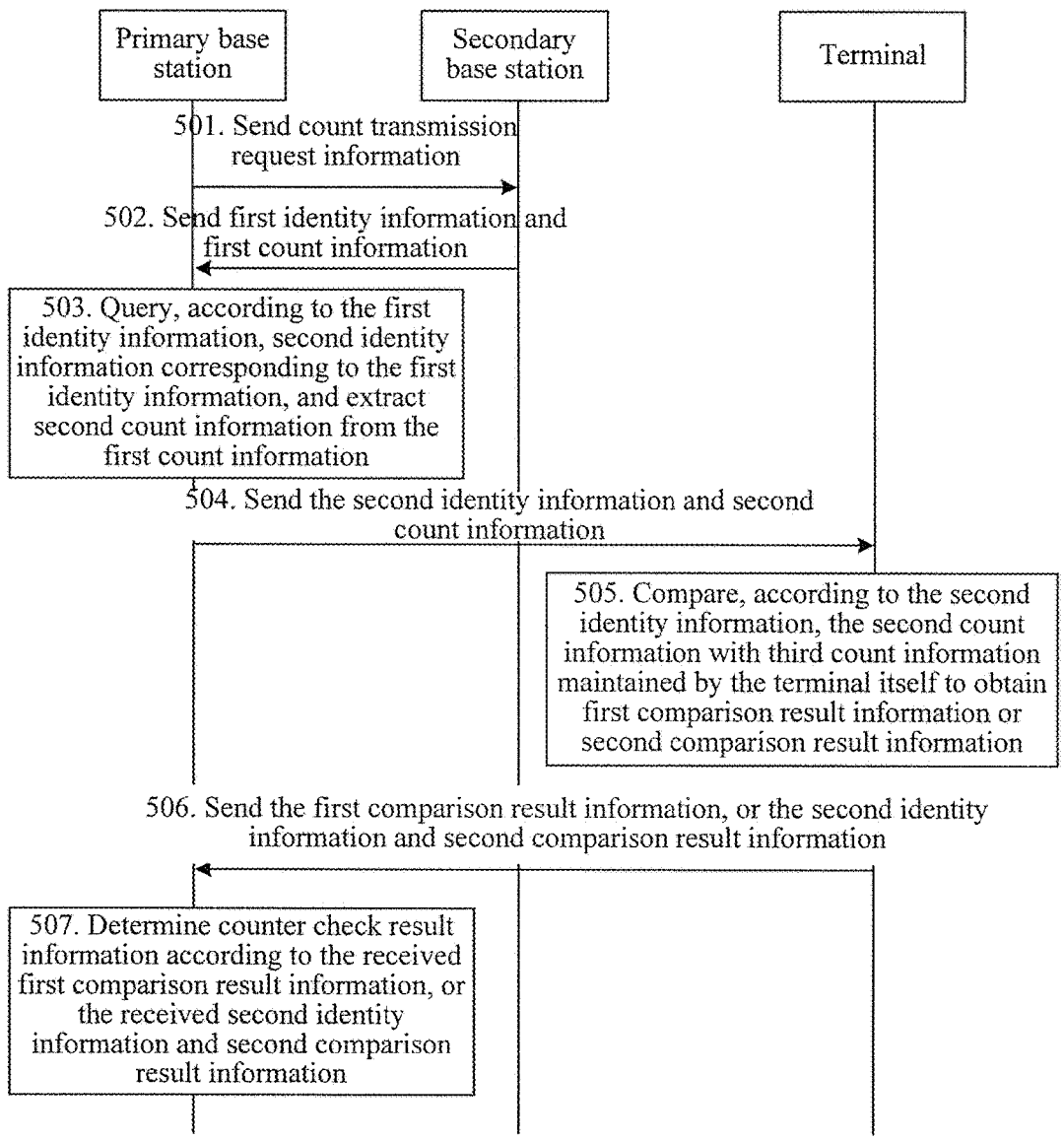
FIG. 5 is an information interaction diagram of a counter check method according to Embodiment 5 of the present invention.

FIG. 5 is an information interaction diagram of a counter check method according to Embodiment 5 of the present invention. As shown in the figure, the embodiment of the present invention specifically includes the following steps:

Step 501: A primary base station sends count transmission request information to a secondary base station, so that the secondary base station determines first count information according to the count transmission request information.

Specifically, if the count transmission request information includes only identity information of a terminal, the secondary base station determines, according to a received identity of the terminal, first count information of each DRB borne by the terminal to be fed back to the primary base station; or if the count transmission request information includes identity information and E-RAB identity information of a terminal, namely, first identity information, the secondary base station determines, according to the received first identity information, the first count information corresponding to the first identity information. The first count information includes a first uplink count value and a first downlink count value of an E-RAB identity of the terminal, or first n bits of a first uplink count value and first n bits of a first downlink count value of an E-RAB identity of the terminal, where n is a user-defined numeric value.

Step 502 to step 507 are the same as step 401 to step 406, and are not further described in detail herein.

Figure 6:
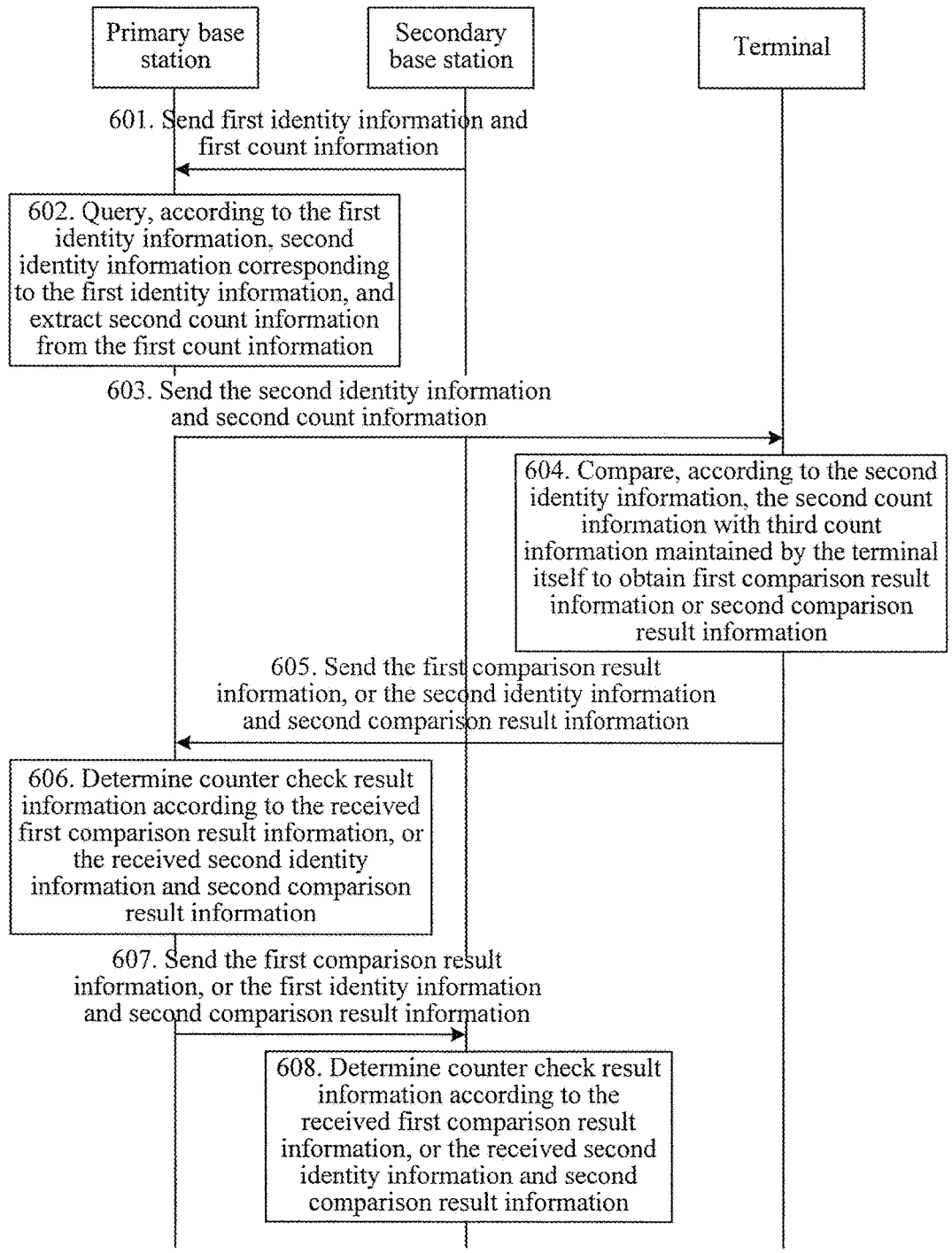
FIG. 6 is an information interaction diagram of a counter check method according to Embodiment 6 of the present invention.

FIG. 6 is an information interaction diagram of a counter check method according to Embodiment 6 of the present invention. As shown in the figure, the embodiment of the present invention specifically includes the following steps:

Step 601 to step 606 are the same as step 401 to step 406, and are not further described in detail herein.

Step 607: The primary base station sends the first comparison result information, or the first identity information and second comparison result information to the secondary base station. The first identity information is an identity and an E-RAB identity of the terminal, the first comparison result information is null information, and the second comparison result information is third count information maintained by the terminal itself.

Step 608: The secondary base station determines counter check result information according to the received first comparison result information or second comparison result information.

Specifically, when the first comparison result information is received, it is determined that the counter check result information is that the first count information is consistent with the third count information; when the second comparison result information is received, it is determined that the counter check result information is that the first count information is inconsistent with the third count information.

The foregoing Embodiment 5 and Embodiment 6 of the present invention provide two different counter check methods. In addition, another exemplary embodiment includes step 501 to step 507 of Embodiment 5 of the present invention, and step 607 and step 608 of Embodiment 6 of the present invention. Specific content of each step is already described in detail in Embodiment 5 or Embodiment 6 of the present invention, and is not repeated herein.

Therefore, in the foregoing counter check methods provided by Embodiment 2 to Embodiment 6 of the present invention, a primary base station receives first identity information and first count information from a secondary base station, and converts the first identity information into second identity information, and meanwhile extracts second count information from the first count information and sends the second count information to a terminal, so that the terminal makes a comparison with third count info nation maintained by the terminal itself and feeds back first comparison information or second comparison information to the primary base station; the primary base station determines a counter check result, thereby implementing a counter check process in a network architecture in which a primary base station is separated from a secondary base station.

Figure 7:
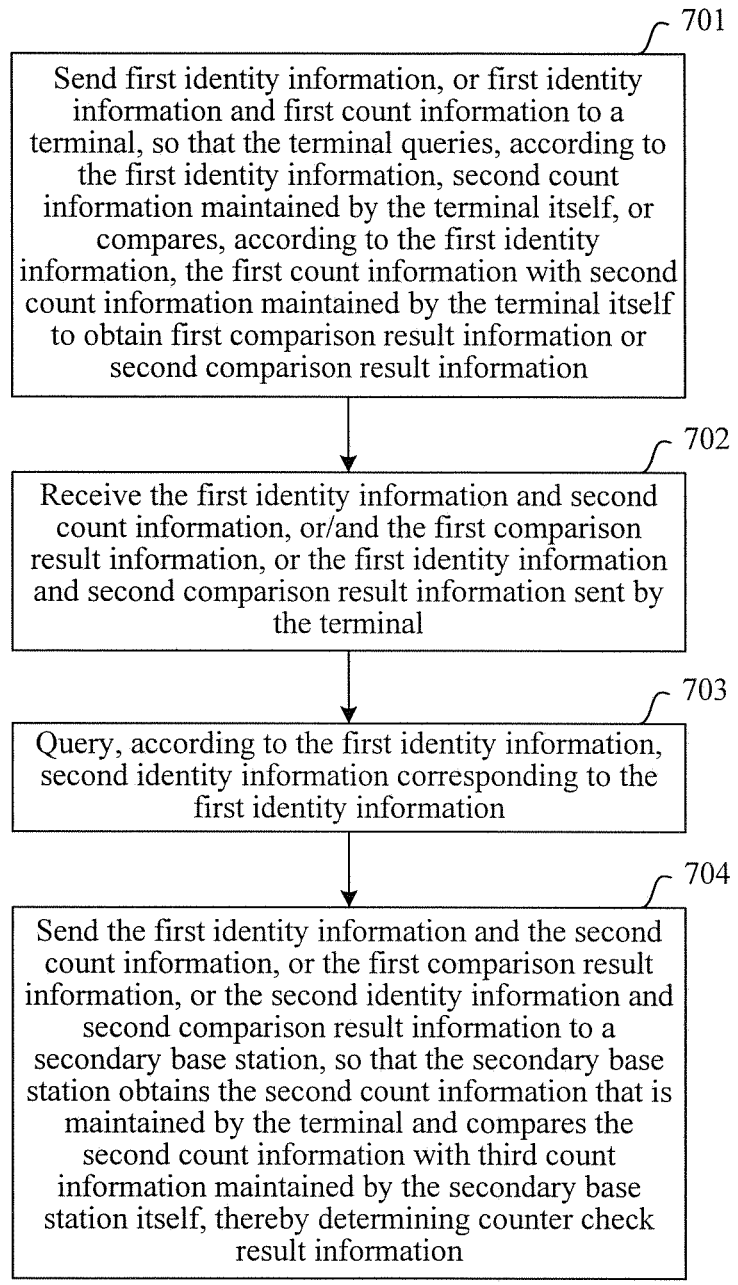
FIG. 7 is a flowchart of a counter check method according to Embodiment 7 of the present invention.

FIG. 7 is a flowchart of a counter check method according to Embodiment 7 of the present invention. As shown in the figure, the embodiment of the present invention specifically includes the following steps:

Step 701: A primary base station sends first identity information, or first identity information and first count information to a terminal, so that the terminal queries, according to the first identity information, second count information maintained by the terminal itself, or compares, according to the first identity information, the first count information with second count information maintained by the terminal itself to obtain first comparison result information or second comparison result information. According to the first identity information, the terminal makes a first comparison between a first uplink count value and a second uplink count value that is maintained by the terminal itself and corresponding to the first identity information, and/or makes a second comparison between a first downlink count value and a second downlink count value that is maintained by the terminal itself and corresponding to the first identity information; when a comparison result of the first comparison is same, and a comparison result of the second comparison is same, obtains the first comparison result information; or when a comparison result of the first comparison is different, and/or a comparison result of the second comparison is different, obtains the second comparison result information; the first comparison result information is null information, the second comparison result information is the second count information maintained by the terminal itself, and the second count information maintained by the terminal itself includes the second uplink count value and the second downlink count value.

Specifically, when the primary base station sends the first identity information to the terminal, the terminal queries, according to the received first identity information, second count information maintained by the ten final itself and corresponding to the first identity information, and uses the second count information as information for feedback to the primary base station.

When the primary base station sends the first identity information and first count information to the terminal, the first identity information is a DRB identity of the terminal. The first count information includes m bits of the first uplink downlink count value and m bits of the first downlink count value, where m is a user-defined value. In addition, the first count information is a random value decided by the primary base station or a fixed value pre-agreed by a system. For example, the first uplink count value is m 0s, and the first downlink count value is also m 0s. A possibility that the random value is the same as the second count information maintained by the terminal itself is very small. A purpose of the counter check method is that the primary base station needs to obtain the second count information maintained by the terminal itself and sends the second count information to a secondary base station, so that the secondary base station makes a comparison.

If the first uplink count value and the first downlink count value are of m bits, according to the DRB identity in the first identity information, the terminal queries the second count information maintained by the terminal itself, separately extracts first m bits of the second uplink count value and first m bits of the second downlink count value from the second count information, then makes a first comparison between the m-bit first uplink count value and the m-bit second uplink count value, and meanwhile makes a second comparison between the m-bit first downlink count value and the m-bit second downlink count value.

When the m-bit first uplink count value is the same as the m-bit second uplink count value, and the m-bit first downlink count value is also the same as the m-bit second downlink count value, information fed back to the primary base station is null information, namely, the first comparison result information. However, a possibility that this case occurs is very small.

When the m-bit first uplink count value is different from the m-bit second uplink count value, and/or the m-bit first downlink count value is different from the m-bit second downlink count value, information fed back to the primary base station is the second count information maintained by the terminal itself, namely, the second comparison result information.

Step 702: The primary base station receives the first identity information and second count information sent by the terminal, or the first comparison result information sent by the terminal, or the first identity information and second comparison result information sent by the terminal. The first comparison result information is null information, and the second comparison result information is the second count information maintained by the terminal itself.

Step 703: The primary base station queries, according to the first identity information, second identity information corresponding to the first identity information. The second identity information is an identity of the terminal and an E-RAB identity of the terminal.

Specifically, a connection between the primary base station and the terminal may bear multiple DRBs, and a connection between the primary base station and a core network may bear multiple E-RABs. For a same terminal, each DRB is corresponding to a unique E-RAB.

Step 704: The primary base station sends the second identity information and the second count information, or the first comparison result information, or the second identity information and second comparison result information to a secondary base station, so that the secondary base station obtains the second count information maintained by the terminal itself and compares the second count information with third count information maintained by the secondary base station itself, thereby determining final counter check result information. The second identity information is the identity of the terminal and the E-RAB identity of the terminal, and the third count information maintained by the secondary base station itself includes a third uplink count value and a third downlink count value.

Figure 8:
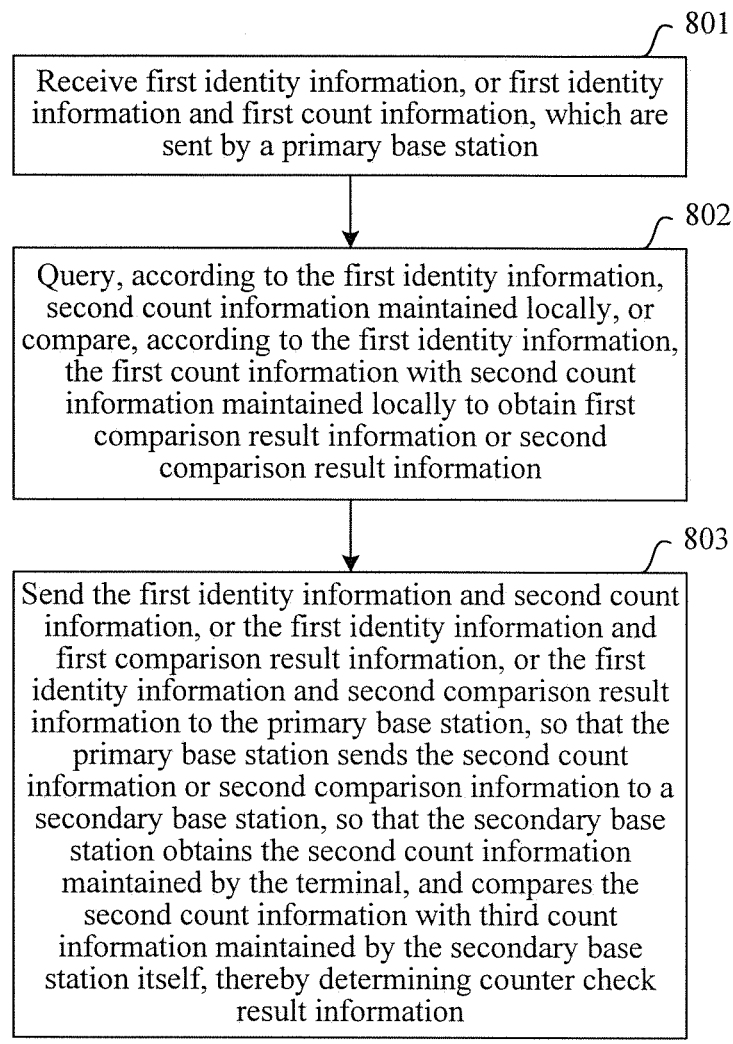
FIG. 8 is a flowchart of a counter check method according to Embodiment 8 of the present invention.

FIG. 8 is a flowchart of a counter check method according to Embodiment 8 of the present invention. As shown in the figure, the embodiment of the present invention specifically includes the following steps:

Step 801: Receive first identity information and first count information sent by a primary base station, where the first identity information is a DRB identity of a terminal.

Step 802: Compare, according to the first identity information, the first count information with second count information maintained locally to obtain first comparison result information or second comparison result information. According to the first identity information, the terminal makes a first comparison between a first uplink count value and a second uplink count value that is maintained by the terminal itself and corresponding to the first identity information, and meanwhile makes a second comparison between a first downlink count value and a second downlink count value that is maintained by the terminal itself and corresponding to the first identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the second count information maintained by the terminal itself, and the second count information maintained by the terminal itself includes the second uplink count value and the second downlink count value.

Specifically, if the first uplink count value and the first downlink count value are of m bits, the terminal queries the second count information maintained by the terminal itself according to the DRB identity in the first identity information, separately extracts first m bits of the second uplink count value and first m bits of the second downlink count value from the second count information, then makes a first comparison between the m-bit first uplink count value and the m-bit second uplink count value, and meanwhile makes a second comparison between the m-bit first downlink count value and the m-bit second downlink count value.

When the m-bit first uplink count value is the same as the m-bit second uplink count value, and the m-bit first downlink count value is also the same as the m-bit second downlink count value, information fed back to the primary base station is null information, namely, the first comparison result information. However, a possibility that this case occurs is very small.

When the m-bit first uplink count value is different from the m-bit second uplink count value, and/or the m-bit first downlink count value is also different from the m-bit second downlink count value, information fed back to the primary base station is the second count information maintained by the terminal itself, namely, the second comparison result information.

Step 803: The terminal sends the first comparison result information, or the first identity information and second comparison result information to the primary base station, so that the primary base station forwards the first comparison result information or second comparison result information to a secondary base station, so that the secondary base station determines, according to the first comparison result information or second comparison result information, counter check result information and obtains the second count information maintained by the terminal itself.

Figure 9:
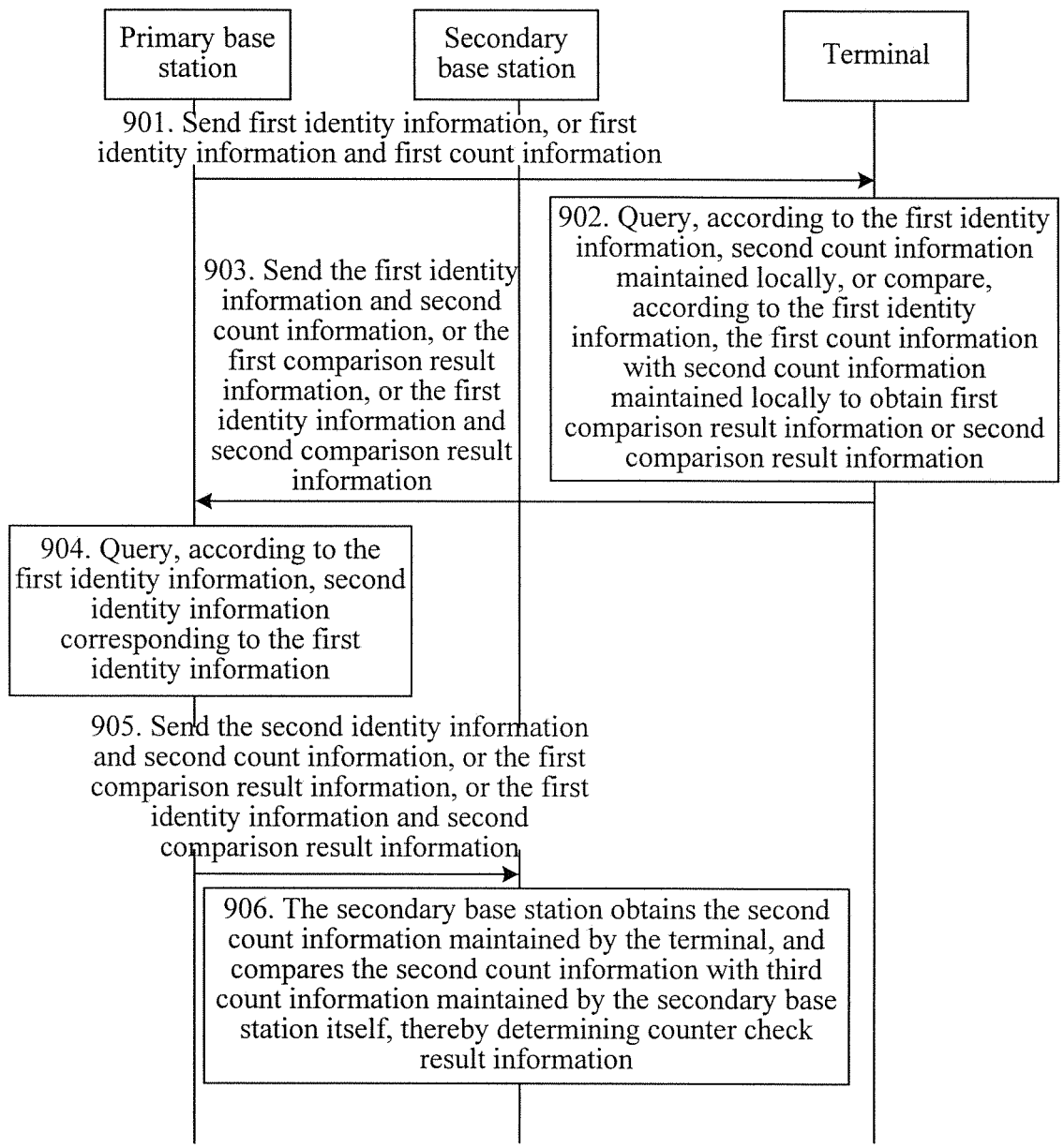
FIG. 9 is an information interaction diagram of a counter check method according to Embodiment 9 of the present invention.

FIG. 9 is an information interaction diagram of a counter check method according to Embodiment 9 of the present invention. As shown in the figure, the embodiment of the present invention specifically includes the following steps:

Step 901: A primary base station sends first identity information, or first identity information and first count information, to a terminal. This step is the same as step 701, and is not further described in detail herein.

Step 902: The terminal queries, according to the first identity information, second count information maintained by the terminal itself, or compares, according to the first identity information, the first count information with second count information maintained by the terminal itself to obtain first comparison result information or second comparison result information. This step is the same as step 802, and is not further described in detail herein.

Step 903: The terminal sends the first identity information and second count information, or the first comparison result information, or the first identity information and second comparison result information to the primary base station. This step is the same as step 803, and is not further described in detail herein.

Step 904: The primary base station queries, according to the first identity information, second identity information corresponding to the first identity information. This step is the same as step 703, and is not further described in detail herein.

Step 905: The primary base station sends the second identity information and second count information, or the first comparison result information, or the second identity information and second comparison result information to a secondary base station. The first comparison result information is null information, and the second comparison result information is the second count information maintained by the terminal itself. This step is the same as step 704, and is not further described in detail herein.

Step 906: The secondary base station obtains, according to the second count information or second comparison result information, the second count information maintained by the terminal itself, and compares the second count information with third count information maintained by the secondary base station itself, thereby determining counter check result information.

Therefore, in the foregoing counter check methods provided by Embodiment 7 to Embodiment 9 of the present invention, a primary base station presets first count information to a random value, and sends first identity information and the preset first count information to a terminal, so that the terminal makes a comparison with second count information maintained by the terminal itself and feeds back first comparison information or second comparison information to the primary base station; the primary base station then forwards the first comparison information or second comparison information to a secondary base station, so that the secondary base station determines a counter check result and obtains the second count information maintained by the terminal itself, thereby implementing a counter check process in a network architecture in which a primary base station is separated from a secondary base station.

Figure 10:
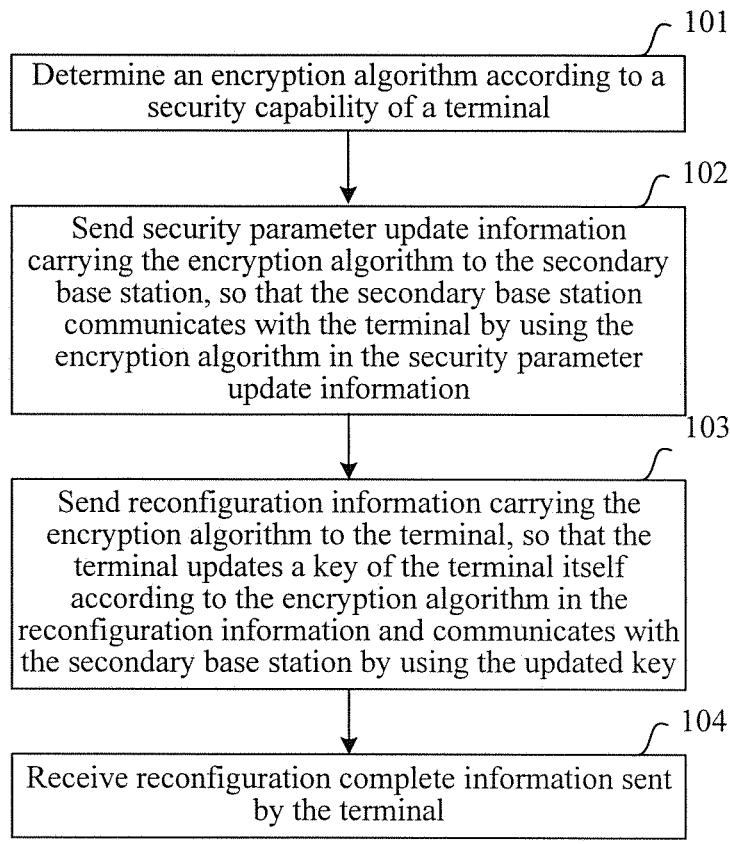
FIG. 10 is a flowchart of a reconfiguration method according to Embodiment 10 of the present invention.

FIG. 10 is a flowchart of a reconfiguration method according to Embodiment 10 of the present invention. As shown in the figure, the embodiment of the present invention specifically includes the following steps:

Step 101: A primary base station determines, according to a security capability of a terminal, an encryption algorithm used by a secondary base station and the terminal. There are multiple encryption algorithms, for example, eea0, eea1, and eea2. The primary base station may determine the encryption algorithm according to an actual condition of the terminal, where the encryption algorithm is not only applicable to the terminal but also applicable to the secondary base station.

Step 102: The primary base station sends security parameter update information carrying the encryption algorithm to the secondary base station, so that the secondary base station communicates with the terminal by using the encryption algorithm in the security parameter update information. The encryption algorithm is determined by the primary base station. To ensure secure communication between the terminal and the secondary base station, the primary base station notifies the encryption algorithm to the secondary base station.

Step 103: The primary base station sends reconfiguration information carrying the encryption algorithm to the terminal, so that the terminal updates a key of the terminal itself according to the encryption algorithm in the reconfiguration information and communicates with the secondary base station by using the encryption algorithm and the updated key. The encryption algorithm is determined by the primary base station. To ensure secure communication between the terminal and the secondary base station, the primary base station not only notifies the encryption algorithm to the secondary base station, but also notifies the encryption algorithm to the terminal, so that the terminal generates a key again by using the encryption algorithm and performs secure communication with the secondary base station by using the encryption algorithm and the key.

Step 104: The primary base station receives reconfiguration complete information sent by the terminal. After completing an update of the key, the terminal may feed back update complete information to the primary base station, so that the primary base station knows that the terminal completes a reconfiguration and may perform secure communication with the secondary base station.

Step 102 is executed first, and then step 103 is executed; or step 103 is executed first, and then step 102 is executed; or step 102 and step 103 are executed simultaneously; or after step 103 and step 104 are executed, step 102 is executed. A specific implementation process of the steps is not further described in detail.

Figure 11:
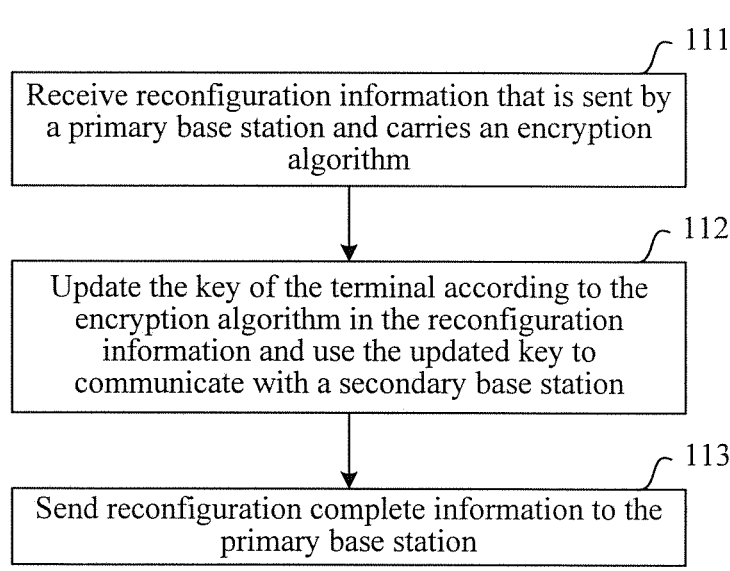
FIG. 11 is a flowchart of a reconfiguration method according to Embodiment 11 of the present invention.

FIG. 11 is a flowchart of a reconfiguration method according to Embodiment 11 of the present invention. As shown in the figure, the embodiment of the present invention specifically includes the following steps:

Step 111: A terminal receives reconfiguration information that is sent by a primary base station and carries an encryption algorithm. The encryption algorithm is determined by the primary base station. To ensure secure communication between the terminal and a secondary base station, the primary base station not only notifies the encryption algorithm to the secondary base station, but also notifies the encryption algorithm to the terminal, so that the terminal generates a key again by using the encryption algorithm and performs secure communication with the secondary base station by using the key.

Step 112: The terminal updates the key of the terminal according to the encryption algorithm in the reconfiguration information and uses the encryption algorithm and the updated key to communicate with a secondary base station.

Specifically, the terminal generates a key again by using the encryption algorithm in the reconfiguration information, and performs secure communication with the secondary base station by using the key.

Step 113: The terminal sends reconfiguration complete information to the primary base station.

Specifically, after completing an update of the key, the terminal feeds back update complete information to the primary base station, so that the primary base station knows that the terminal completes a reconfiguration and may perform secure communication with the secondary base station.

Figure 12:
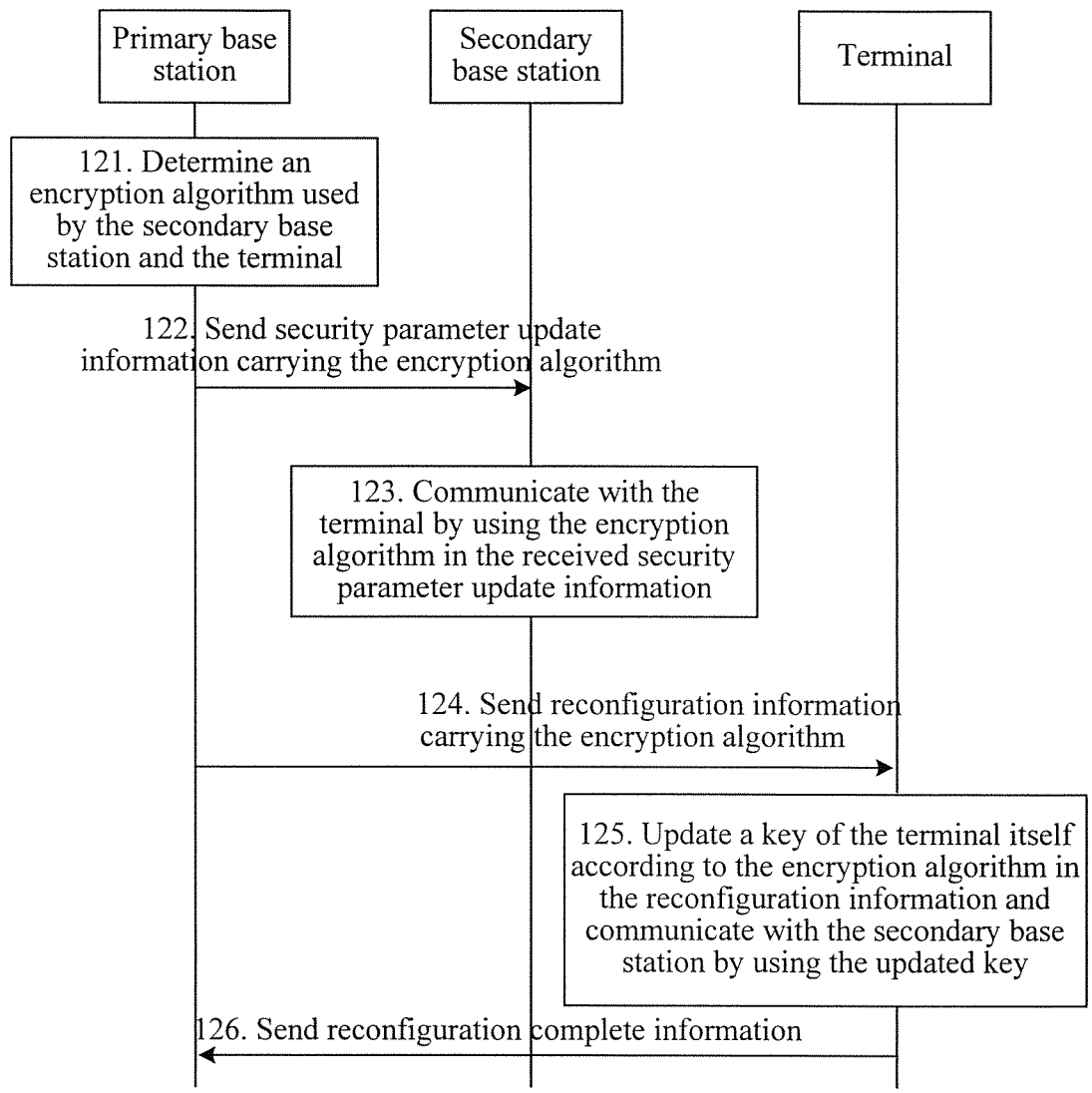
FIG. 12 is an information interaction diagram of a reconfiguration method according to Embodiment 12 of the present invention.

FIG. 12 is an information interaction diagram of a reconfiguration method according to Embodiment 12 of the present invention. As shown in the figure, the embodiment of the present invention specifically includes the following steps:

Step 121: A primary base station determines, according to a security capability of a terminal, an encryption algorithm used by a secondary base station and the terminal. This step is the same as step 101, and is not further described in detail herein.

Step 122: The primary base station sends security parameter update information carrying the encryption algorithm to the secondary base station.

Step 123: The secondary base station communicates with the terminal by using the encryption algorithm in the received security parameter update information, where the encryption algorithm is determined by the primary base station.

Step 124: The primary base station sends reconfiguration information carrying the encryption algorithm to the terminal.

Step 126: After receiving the reconfiguration information carrying the encryption algorithm, the terminal updates a key of the terminal according to the encryption algorithm in the reconfiguration information and communicates with the secondary base station by using the encryption algorithm and the updated key. The encryption algorithm is determined by the primary base station.

Step 126: The terminal sends reconfiguration complete information to the primary base station.

Figure 13:
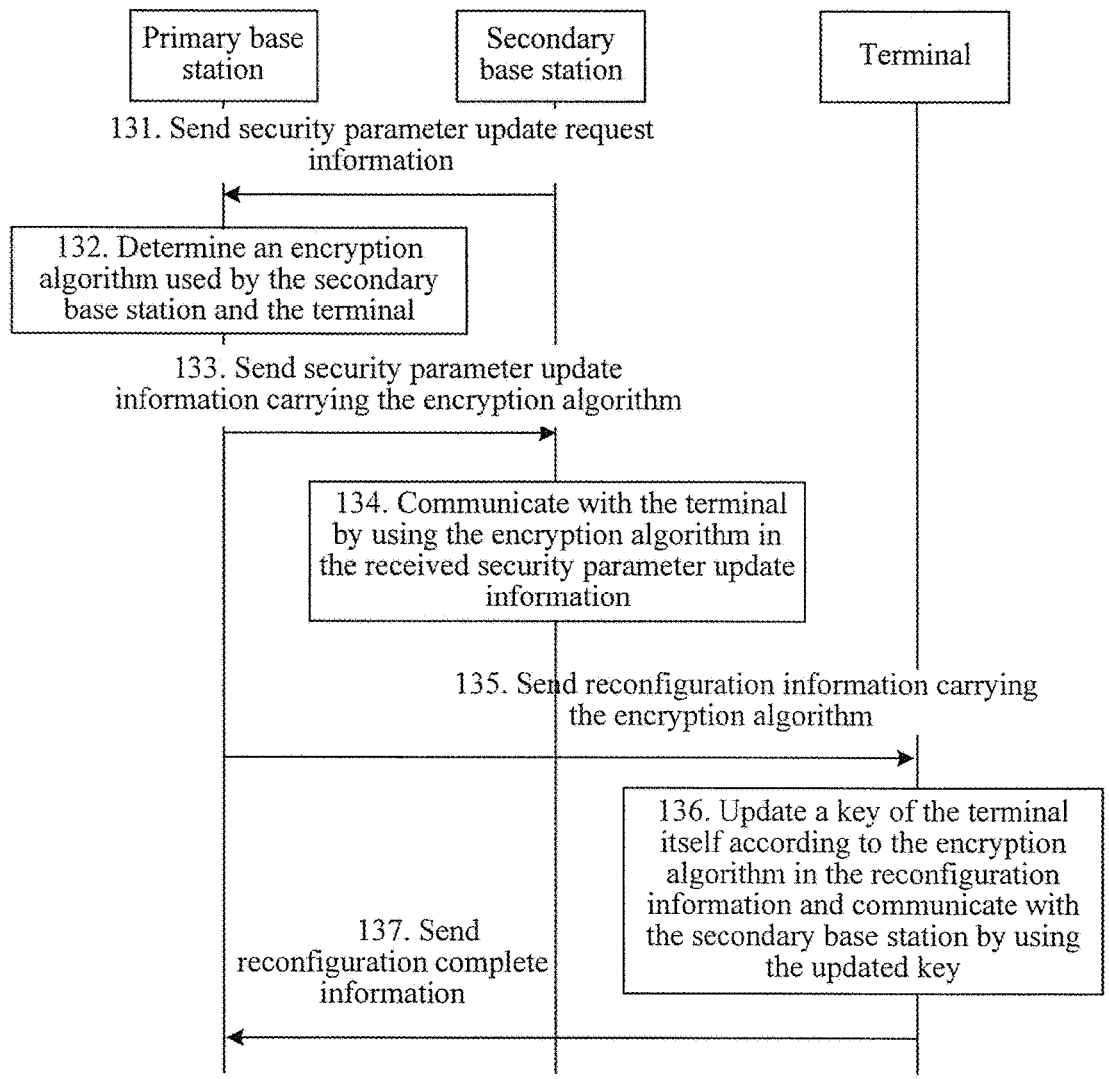
FIG. 13 is an information interaction diagram of a reconfiguration method according to Embodiment 13 of the present invention.

FIG. 13 is an information interaction diagram of a reconfiguration method according to Embodiment 13 of the present invention. As shown in the figure, the embodiment of the present invention specifically includes the following steps:

Step 131: A secondary base station sends security parameter update request information to a primary base station. The security parameter update request information includes a security parameter update request cause. The security parameter update request cause is that a count value maintained by the secondary base station overflows or that a count value maintained by the secondary base station is incorrect. When the count value maintained by the secondary base station is different from a count value maintained by the terminal itself and corresponding to the count value, it is considered that the count value maintained by the secondary base station is incorrect.

Step 132 to step 137 are the same as step 121 to step 126, and are not further described in detail herein.

Therefore, in the foregoing reconfiguration methods provided by Embodiment 10 to Embodiment 13 of the present invention, a primary base station determines an encryption algorithm used by a secondary base station and a terminal, and sends the encryption algorithm to the secondary base station and the terminal respectively; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

Figure 14:
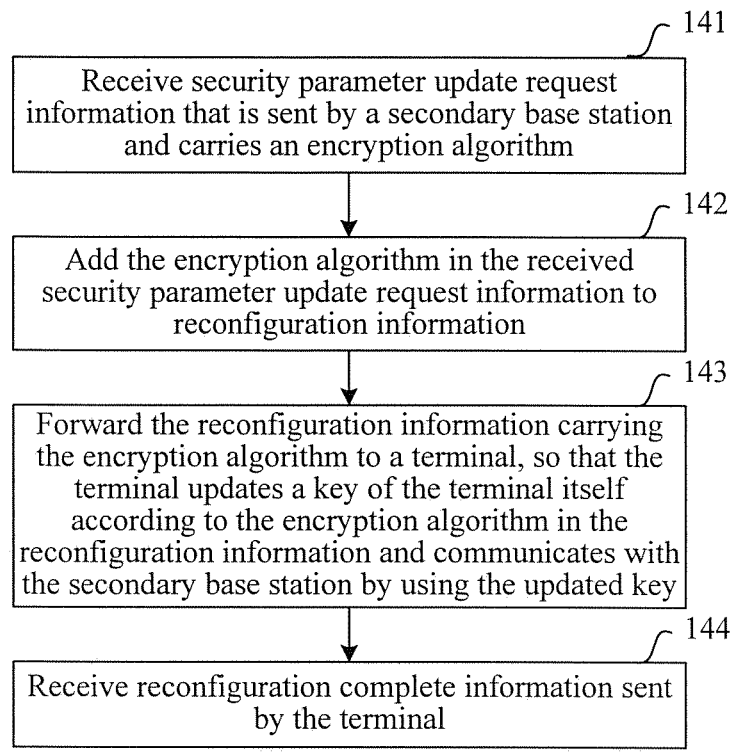
FIG. 14 is a flowchart of a reconfiguration method according to Embodiment 14 of the present invention.

FIG. 14 is a flowchart of a reconfiguration method according to Embodiment 14 of the present invention. As shown in the figure, the embodiment of the present invention specifically includes the following steps:

Step 141: A primary base station receives security parameter update request information that is sent by a secondary base station and carries an encryption algorithm. The encryption algorithm is determined by the secondary base station. There are multiple encryption algorithms currently, for example, eea0, eea1, and eea2. The secondary base station may determine an encryption algorithm according to an actual condition of a terminal, where the encryption algorithm is not only applicable to the secondary base station but also applicable to the terminal. In addition, the security parameter update request information may further include a security parameter update request cause. The security parameter update request cause is that a count value maintained by the secondary base station overflows or that a count value maintained by the secondary base station is incorrect. When the count value maintained by the secondary base station is different from a count value maintained by the terminal itself and corresponding to the count value, it is considered that the count value maintained by the secondary base station is incorrect. The security parameter update request information includes the encryption algorithm, or the encryption algorithm and security parameter update request cause information. The security parameter update request cause information includes that a count value maintained by the secondary base station overflows or that a counter check result is inconsistent.

Step 142: The primary base station adds the encryption algorithm in the received security parameter update request information to reconfiguration information.

Step 143: The primary base station sends the reconfiguration information carrying the encryption algorithm to a terminal, so that the terminal updates a key of the terminal itself according to the encryption algorithm in the reconfiguration information and communicates with the secondary base station by using the encryption algorithm and the updated key.

Step 144: The primary base station receives reconfiguration complete information sent by the terminal.

Figure 15:
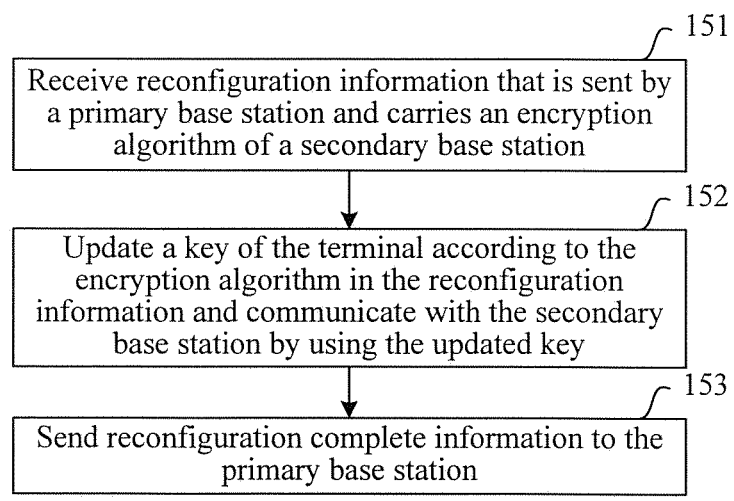
FIG. 15 is a flowchart of a reconfiguration method according to Embodiment 15 of the present invention.

FIG. 15 is a flowchart of a reconfiguration method according to Embodiment 15 of the present invention. As shown in the figure, the embodiment of the present invention specifically includes the following steps:

Step 151: A terminal receives reconfiguration information that is forwarded by a primary base station and carries an encryption algorithm.

Step 152: The terminal updates a key of the terminal according to the encryption algorithm in the reconfiguration information and communicates with a secondary base station by using the encryption algorithm and the updated key.

Step 153: The terminal sends reconfiguration complete information to the primary base station.

Figure 16:
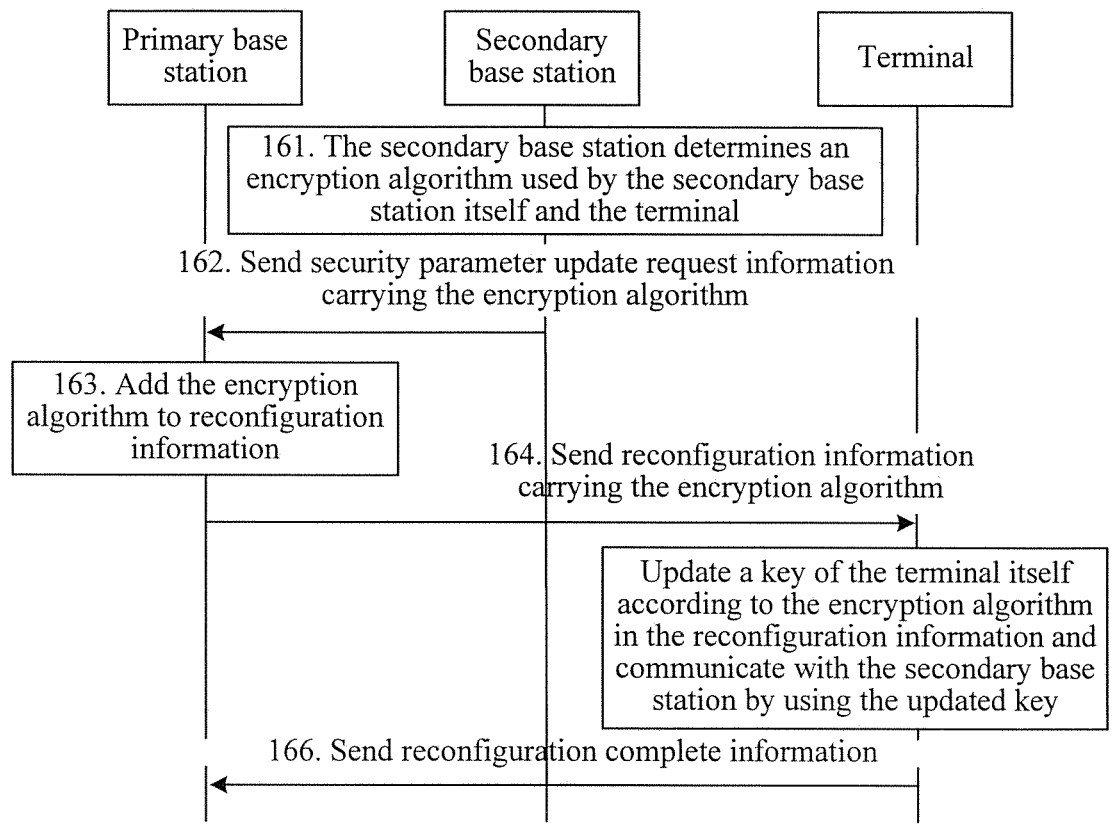
FIG. 16 is an information interaction diagram of a reconfiguration method according to Embodiment 16 of the present invention.

FIG. 16 is an information interaction diagram of a reconfiguration method according to Embodiment 16 of the present invention. As shown in the figure, the embodiment of the present invention specifically includes the following steps:

Step 161: A secondary base station determines an encryption algorithm used by the secondary base station and a terminal.

Step 162: The secondary base station sends security parameter update request information carrying the encryption algorithm, where the security parameter update request information carries the encryption algorithm, and may further include security parameter update request cause information. The security parameter update request cause is that a count value maintained by the secondary base station overflows or that a count value maintained by the secondary base station is incorrect. When the count value maintained by the secondary base station is different from a count value maintained by the terminal itself and corresponding to the count value, it is considered that the count value maintained by the secondary base station is incorrect.

Step 163: A primary base station adds the encryption algorithm to reconfiguration information.

Step 164: Send the reconfiguration information carrying the encryption algorithm to the terminal. The encryption algorithm is determined by the secondary base station.

Step 165: After receiving the reconfiguration information carrying the encryption algorithm, the terminal updates a key of the terminal according to the encryption algorithm in the reconfiguration information and communicates with the secondary base station by using the encryption algorithm and the updated key.

Step 166: The terminal sends reconfiguration complete information to the primary base station.

Figure 17:
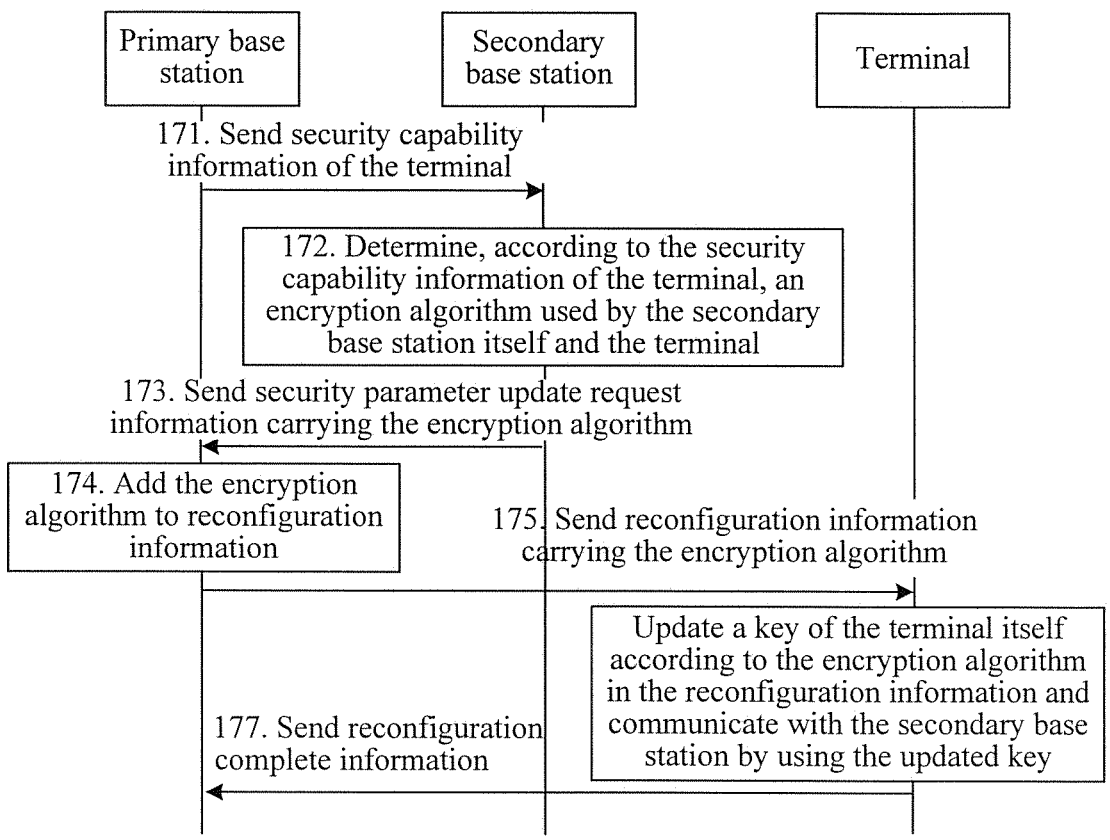
FIG. 17 is an information interaction diagram of a reconfiguration method according to Embodiment 17 of the present invention.

FIG. 17 is an information interaction diagram of a reconfiguration method according to Embodiment 17 of the present invention. As shown in the figure, the embodiment of the present invention specifically includes the following steps:

Step 171: A primary base station sends security capability information of a terminal to a secondary base station.

Step 172: The secondary base station determines, according to the received security capability information of the terminal, an encryption algorithm used by the secondary base station itself for communication with the terminal.

Step 173 to step 177 are the same as step 162 to step 166, and are not further described in detail herein.

Figure 18:
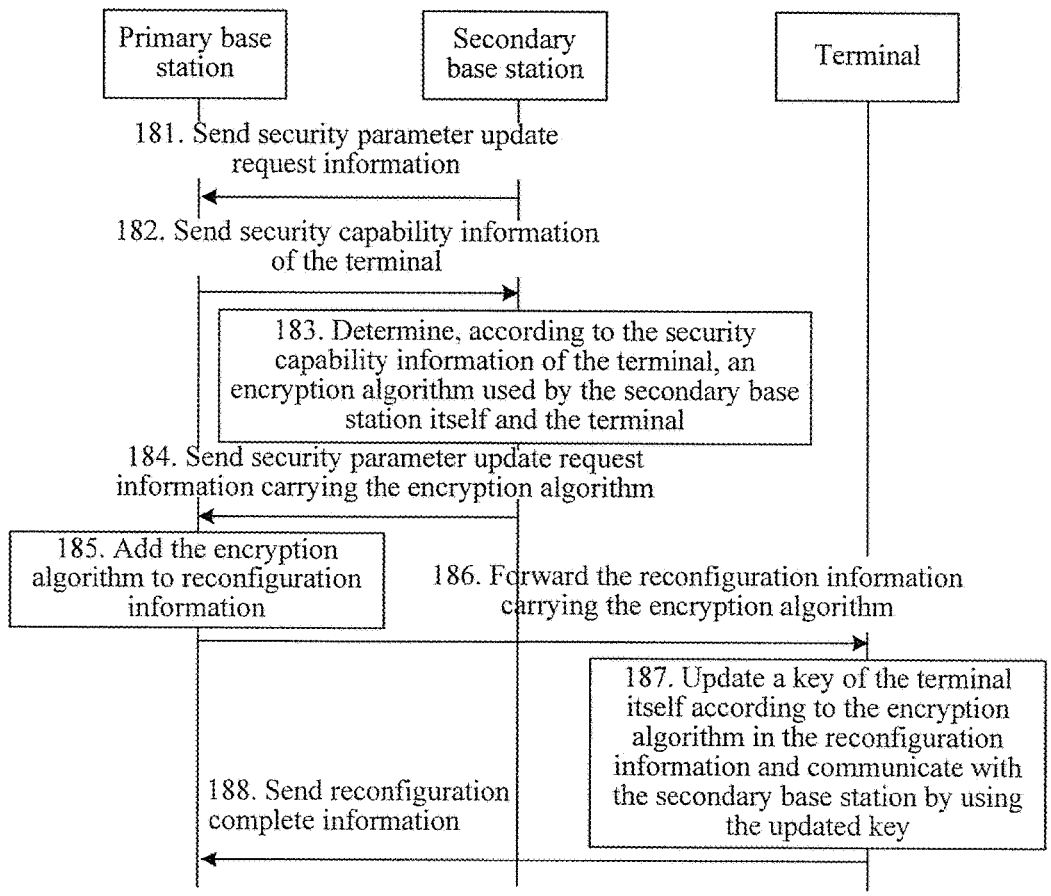
FIG. 18 is an information interaction diagram of a reconfiguration method according to Embodiment 18 of the present invention.

FIG. 18 is an information interaction diagram of a reconfiguration method according to Embodiment 18 of the present invention. As shown in the figure, the embodiment of the present invention specifically includes the following steps:

Step 181: A secondary base station sends security parameter update request cause information to a primary base station. The security parameter update request cause information is that a count value maintained by the secondary base station overflows or that a count value maintained by the secondary base station is incorrect. When the count value maintained by the secondary base station is different from a count value maintained by a terminal itself and corresponding to the count value, it is considered that the count value maintained by the secondary base station is incorrect.

Step 182 to step 188 are the same as step 171 to step 177, and are not further described in detail herein. Security parameter update request information in this embodiment includes only an encryption algorithm.

Therefore, in the foregoing reconfiguration methods provided by Embodiment 14 to Embodiment 18 of the present invention, a secondary base station determines an encryption algorithm used by the secondary base station itself and a terminal, and sends the encryption algorithm to a primary base station; the primary base station then sends the encryption algorithm to the terminal; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

Figure 19:
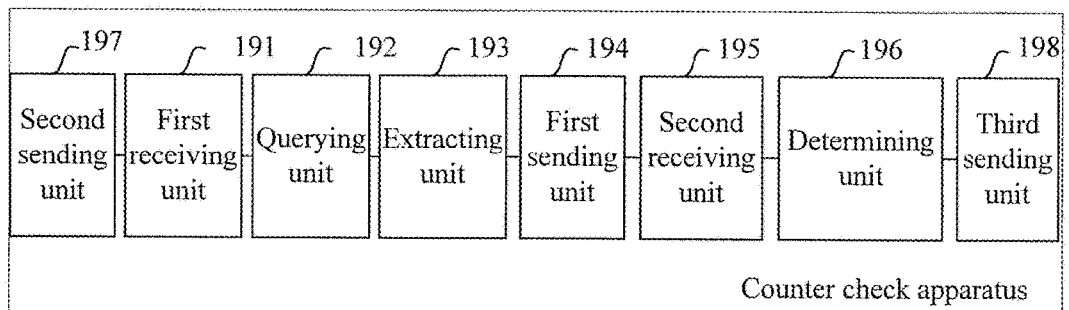
FIG. 19 is a schematic diagram of a counter check apparatus according to Embodiment 19 of the present invention.

FIG. 19 is a schematic diagram of a counter check apparatus according to Embodiment 19 of the present invention. This apparatus is configured to execute the counter check method provided by any embodiment of Embodiment 2, Embodiment 4, Embodiment 5, and Embodiment 6 of the present invention. As shown in the figure, the counter check apparatus provided by the embodiment of the present invention specifically includes: a first receiving unit 191, a querying unit 192, an extracting unit 193, a first sending unit 194, a second receiving unit 195, and a determining unit 196.

The first receiving unit 191 is configured to receive first identity information and first count information sent by a secondary base station, and transmit the first identity information to the querying unit, and transmit the first count information to the extracting unit. The first identity information includes an identity of a terminal and a radio access bearer E-RAB identity of the terminal; the first count information includes a first uplink count value and a first downlink count value of the E-RAB identity of the terminal, or first n bits of a first uplink count value and first n bits of a first downlink count value of the E-RAB identity of the terminal.

The querying unit 192 is configured to receive the first identity information from the first receiving unit, query, according to the first identity information, second identity information corresponding to the first identity information, and transmit the second identity information to the first sending unit 194.

Specifically, a data radio bearer DRB identity of the terminal and corresponding to the E-RAB identity is queried according to the identity of the terminal and the radio access bearer E-RAB identity of the terminal, where the DRB identity of the terminal is the second identity information.

The extracting unit 193 is configured to receive the first count information from the first receiving unit, extract second count information from the first count information, and transmit the second count information to the first sending unit 194.

Specifically, first several bits are extracted from the first uplink count value for use as a second uplink count value, and first several bits are extracted from the first downlink count value for use as a second downlink count value, where the second uplink count value and the second downlink count value constitute the second count information. In addition, first m bits may also be extracted from first n bits of the first uplink count value for use as a second uplink count value, and simultaneously first m bits are extracted from first n bits of the first downlink count value for use as a second downlink count value, where m is less than or equal to n. In this case, the second uplink count value and the second downlink count value constitute the second count information.

The first sending unit 194 is configured to receive the second identity information from the querying unit, receive the second count information from the extracting unit, and send the second identity information and the second count information to the terminal, so that the terminal compares, according to the second identity information, the second count information with third count information maintained by the terminal itself to obtain first comparison result information or second comparison result information.

Specifically, according to the second identity information, the terminal makes a first comparison between the second uplink count value and a third uplink count value that is maintained by the terminal itself and corresponding to the second identity information, and/or makes a second comparison between the second downlink count value and a third downlink count value that is maintained by the terminal itself and corresponding to the second identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the third count information maintained by the terminal itself, and the third count information maintained by the terminal itself includes the third uplink count value and the third downlink count value.

The second receiving unit 195 is configured to receive the first comparison result information sent by the terminal, or the second identity information and second comparison result information sent by the terminal, and transmit the first comparison result information, or the second identity information and second comparison result information to the determining unit 196.

The determining unit 196 is configured to receive the first comparison result information, or the second identity information and second comparison result information from the second receiving unit 195, and determine counter check result information according to the received first comparison result information, or the received second identity information and second comparison result information.

Specifically, when the first comparison result information is received, it is determined that the counter check result information is that the first count information is consistent with the third count information; when the second comparison result information is received, it is determined that the counter check result information is that the first count information is inconsistent with the third count information.

In an exemplary embodiment, the counter check apparatus provided by the embodiment of the present invention further includes a second sending unit 197.

The second sending unit 197 is configured to send count transmission request information, so that the secondary base station determines the first count information according to the count transmission request information. The count transmission request information includes the identity of the terminal, or the identity of the terminal and the E-RAB identity of the terminal.

In another exemplary embodiment, preferably, the counter check apparatus provided by the embodiment of the present invention further includes a third sending unit 198.

The third sending unit 198 is configured to receive the first comparison result information, or the second identity information and second comparison result information from the second receiving unit 195, obtain the first identity information according to the second identity information, and send the first comparison result information, or the first identity information and second comparison result information to the secondary base station, so that the secondary base station determines counter check result information according to the received first comparison result information or second comparison result information.

In still another exemplary embodiment, the counter check apparatus provided by the embodiment of the present invention further includes the second sending unit 197 and the third sending unit 198.

Figure 20:
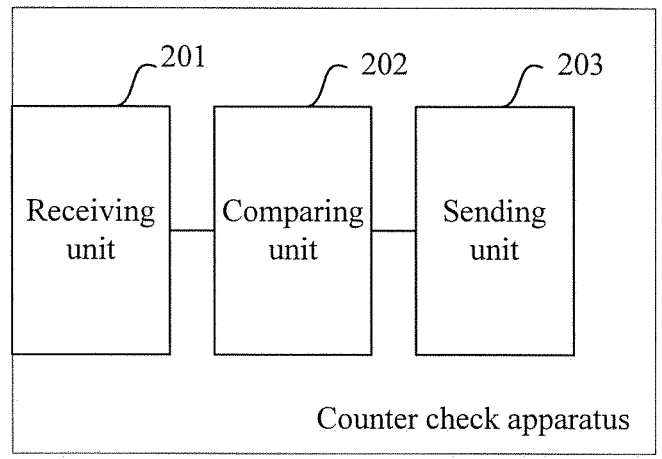
FIG. 20 is a schematic diagram of a counter check apparatus according to Embodiment 20 of the present invention.

FIG. 20 is a schematic diagram of a counter check apparatus according to Embodiment 20 of the present invention. This apparatus is configured to execute the counter check method provided by any embodiment of Embodiment 3, Embodiment 4, Embodiment 5, and Embodiment 6 of the present invention. As shown in the figure, the embodiment of the present invention specifically includes: a receiving unit 201, a comparing unit 202, and a sending unit 203.

The receiving unit 201 is configured to receive second identity information corresponding to first identity information and second count information extracted from first count information sent by a primary base station, and transmit the second identity information to the comparing unit 202 and the sending unit 203, and transmit the second count information to the comparing unit 202. The first count information includes a first uplink count value and a first downlink count value of an E-RAB identity of a terminal, or a first uplink count value and a first downlink count value of an E-RAB identity of a terminal.

Specifically, a DRB identity of the terminal and corresponding to the E-RAB identity is queried according to the identity of the terminal and the radio access bearer E-RAB identity of the terminal, where the DRB identity is the second identity information; and first several bits are extracted from the first uplink count value for use as a second uplink count value, and first several bits are extracted from the first downlink count value for use as a second downlink count value, where the second uplink count value and the second downlink count value constitute the second count information.

The comparing unit 202 is configured to receive the second identity information and the second count information from the receiving unit 201, and compare, according to the second identity information, the second count information with third count information maintained locally to obtain first comparison result information or second comparison result information, and transmit the first comparison result information or the second comparison result information to the sending unit 203.

Specifically, according to the second identity information, a first comparison is made between the second uplink count value and a third uplink count value that is maintained locally and corresponding to the second identity information, and/or a second comparison is made between the second downlink count value and a third downlink count value that is maintained locally and corresponding to the second identity information; when a comparison result of the first comparison is same, and a comparison result of the second comparison is also same, the first comparison result information is obtained; when a comparison result of the first comparison is different, and/or a comparison result of the second comparison is different, the second comparison result information is obtained; the first comparison result information is null information, the second comparison result information is the third count information maintained locally, and the third count information maintained locally includes the third uplink count value and the third downlink count value.

The sending unit 203 is configured to receive the second identity information from the receiving unit 201, and receive the first comparison result information or the second comparison result information from the comparing unit 202, and send the first comparison result information, or the second identity information and second comparison result information to the primary base station, so that the primary base station determines counter check result information according to the first comparison result information or the second comparison result information.

Specifically, when the primary base station receives the first comparison result information, it is determined that the counter check result information is that the first count information is consistent with the third count information; when the second comparison result information is received, it is determined that the counter check result information is that the first count information is inconsistent with the third count information.

Therefore, by using the foregoing counter check apparatuses provided by Embodiment 19 and Embodiment 20 of the present invention, a primary base station receives first identity information and first count information from a secondary base station, and converts the first identity information into second identity information, and meanwhile extracts second count information from the first count information and sends the second count information to a terminal, so that the terminal makes a comparison with third count information maintained by the terminal itself and feeds back first comparison information or second comparison information to the primary base station; the primary base station determines a counter check result, thereby implementing a counter check process in a network architecture in which a primary base station is separated from a secondary base station.

Figure 21:
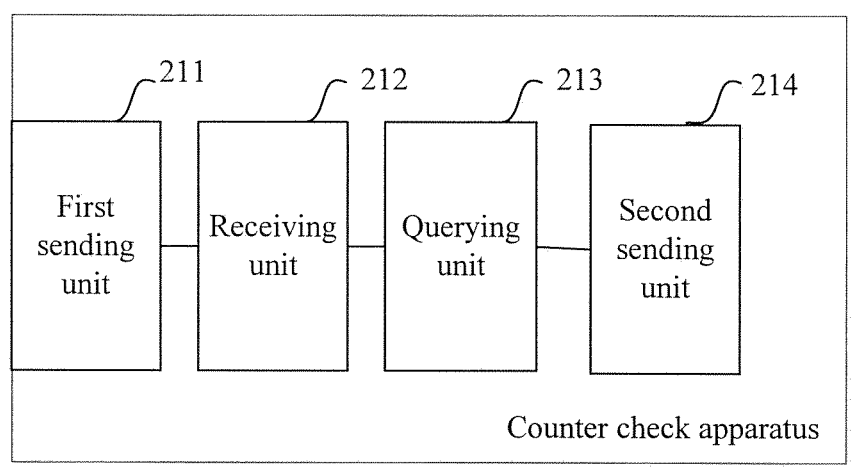
FIG. 21 is a schematic diagram of a counter check apparatus according to Embodiment 21 of the present invention.

FIG. 21 is a schematic diagram of a counter check apparatus according to Embodiment 20 of the present invention. This apparatus is configured to execute the counter check method provided by either embodiment of Embodiment 7 and Embodiment 9 of the present invention. As shown in the figure, the embodiment of the present invention specifically includes: a first sending unit 211, a receiving unit 212, a querying unit 213, and a second sending unit 214.

The first sending unit 211 is configured to send first identity information, or first identity information and first count information to a terminal, so that the terminal queries, according to the first identity information, second count information maintained by the terminal itself, or compares, according to the first identity information, the first count information with second count information maintained by the terminal itself to obtain first comparison result information or second comparison result information. The first identity information is a DRB identity of the terminal, and the first count information is a preset count value.

Specifically, according to the first identity information, the terminal makes a first comparison between a first uplink count value and a second uplink count value that is maintained by the terminal itself and corresponding to the first identity information, and/or makes a second comparison between a first downlink count value and a second downlink count value that is maintained by the terminal itself and corresponding to the first identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the second count information maintained by the terminal itself, and the second count information maintained by the terminal itself includes the second uplink count value and the second downlink count value.

The receiving unit 212 is configured to receive the first identity information and the second count information sent by the terminal, or the first comparison result information sent by the terminal, or the first identity information and second comparison result information sent by the terminal, transmit the first identity information to the querying unit 213, and transmit the second count information, or the first comparison result information, or the second comparison result information to the second sending unit 214.

The querying unit 213 is configured to receive the first identity information from the receiving unit 212, query, according to the first identity information, second identity information corresponding to the first identity information, and transmit the second identity information to the second sending unit 214. The second identity information is identity information of the terminal and an E-RAB identity of the terminal.

The second sending unit 214 is configured to receive the second identity information from the querying unit 213, and receive the second count information, or the first comparison result information, or the second comparison result information from the receiving unit 212, and send the second identity information and the second count information, or the first comparison result information, or the second identity information and the second comparison result information to a secondary base station, so that the secondary base station obtains the second count information maintained by the terminal itself and compares the second count information with third count information maintained by the secondary base station itself, thereby determining counter check result information.

Figure 22:
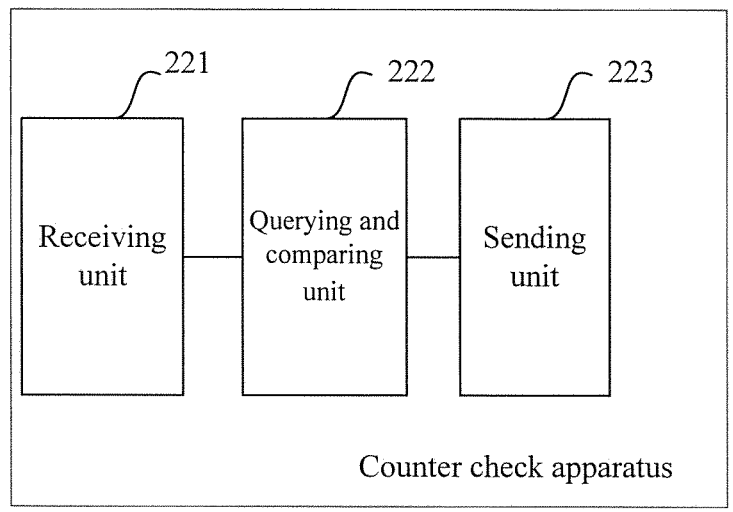
FIG. 22 is a schematic diagram of a counter check apparatus according to Embodiment 22 of the present invention.

FIG. 22 is a schematic diagram of a counter check apparatus according to Embodiment 22 of the present invention. This apparatus is configured to execute the counter check method provided by either embodiment of Embodiment 8 and Embodiment 9 of the present invention. As shown in the figure, the embodiment of the present invention specifically includes: a receiving unit 221, a querying or comparing unit 222, and a sending unit 223.

The receiving unit 221 is configured to receive first identity information, or first identity information and first count information, which are sent by a primary base station, and transmit the first identity information to the querying or comparing unit 222 and the sending unit 223, and transmit the first count information to the comparing unit. The first identity information is a DRB identity of a terminal; the first count information is a preset count value; and the first count information includes a first uplink count value and a first downlink count value.

The querying or comparing unit 222 is configured to receive the first identity information and the first count information from the receiving unit 221, query, according to the first identity information, second count information maintained locally, or compare, according to the first identity information, the first count information with second count information maintained locally to obtain first comparison result information or second comparison result information, and transmit the first identity information. The first count information includes the first uplink count value and the first downlink count value.

Specifically, according to the first identity information, a first comparison is made between the first uplink count value and a second uplink count value that is maintained locally and corresponding to the first identity information, and/or a second comparison is made between the first downlink count value and a second downlink count value that is maintained by the terminal itself and corresponding to the first identity information; when a comparison result of the first comparison is same, and a comparison result of the second comparison is same, the first comparison result information is obtained; when a comparison result of the first comparison is different, and/or a comparison result of the second comparison is different, the second comparison result information is obtained; the first comparison result information is null information, the second comparison result information is the second count information maintained by the terminal itself, and the second count information maintained by the terminal itself includes the second uplink count value and the second downlink count value.

The sending unit 223 is configured to receive the first identity information from the receiving unit 221, and receive the second count information, or the first comparison result information, or the second comparison result information from the querying or comparing unit 222, and send the first identity information and the second count information, or the first comparison result information, or the first identity information and second comparison result information to the primary base station, so that the primary base station sends the second count information, or the first identity information, or the second comparison result information to a secondary base station, and then the secondary base station determines the counter check result information according to the second count information, or the first comparison result information, or the second comparison result information, and obtains the second count information maintained by the terminal itself.

Therefore, by using the foregoing counter check apparatuses provided by Embodiment 21 and Embodiment 22 of the present invention, a primary base station presets first count information to a random value, and sends first identity information and the preset first count information to a terminal, so that the terminal makes a comparison with second count information maintained by the terminal itself and feeds back first comparison information or second comparison information to the primary base station; the primary base station then forwards the first comparison information or second comparison information to a secondary base station, so that the secondary base station determines a counter check result and obtains the second count information maintained by the terminal itself, thereby implementing a counter check process in a network architecture in which a primary base station is separated from a secondary base station.

Figure 23:
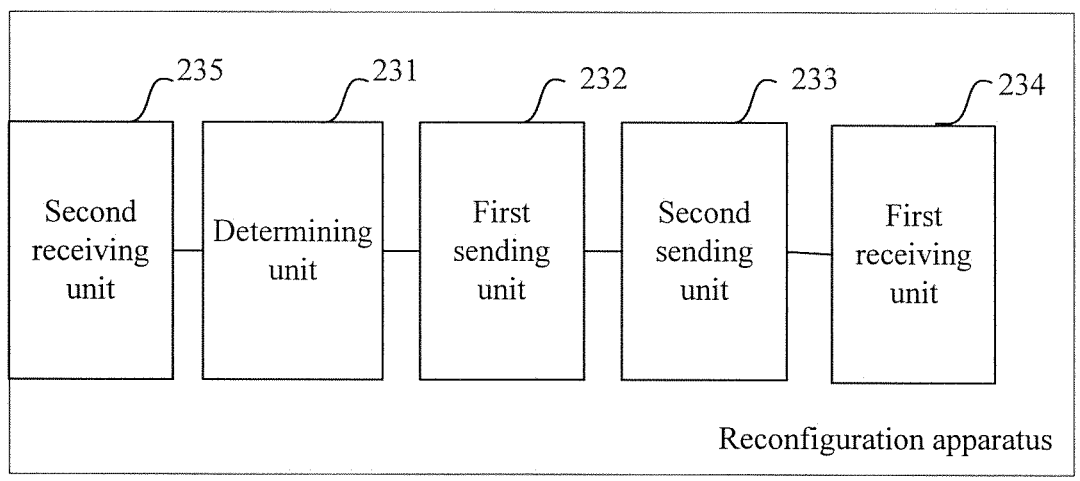
FIG. 23 is a schematic diagram of a reconfiguration apparatus according to Embodiment 23 of the present invention.

FIG. 23 is a schematic diagram of a reconfiguration apparatus according to Embodiment 23 of the present invention. This apparatus is configured to execute the reconfiguration method provided by any embodiment of Embodiment 10, Embodiment 12, and Embodiment 13 of the present invention. As shown in the figure, the reconfiguration apparatus provided by the embodiment of the present invention specifically includes: a determining unit 231, a first sending unit 232, a second sending unit 233, and a first receiving unit 234.

The determining unit 231 is configured to determine an encryption algorithm according to a security capability of a terminal, and transmit the encryption algorithm to the first sending unit 232 and the second sending unit 233.

The first sending unit 232 is configured to receive the encryption algorithm from the determining unit 231, and send reconfiguration information carrying the encryption algorithm to the terminal, so that the terminal updates a key of the terminal itself according to the encryption algorithm in the reconfiguration information and uses the encryption algorithm and the updated key to communicate with a secondary base station.

The second sending unit 233 is configured to receive the encryption algorithm from the determining unit 231, and send security parameter update information carrying the encryption algorithm to the secondary base station, so that the secondary base station communicates with the terminal by using the encryption algorithm in the security parameter update information.

The first receiving unit 234 receives reconfiguration complete information sent by the terminal.

Preferably, the reconfiguration apparatus provided by the embodiment of the present invention further includes a second receiving unit 235, configured to receive security parameter update request information sent by the secondary base station, and transmit the security parameter update request information to the determining unit 231, so that the determining unit 231 determines the encryption algorithm according to the security capability of the terminal after the security parameter update request information is received. The security parameter update request information includes that a count value maintained by the secondary base station overflows or that a counter check result is inconsistent.

Figure 24:
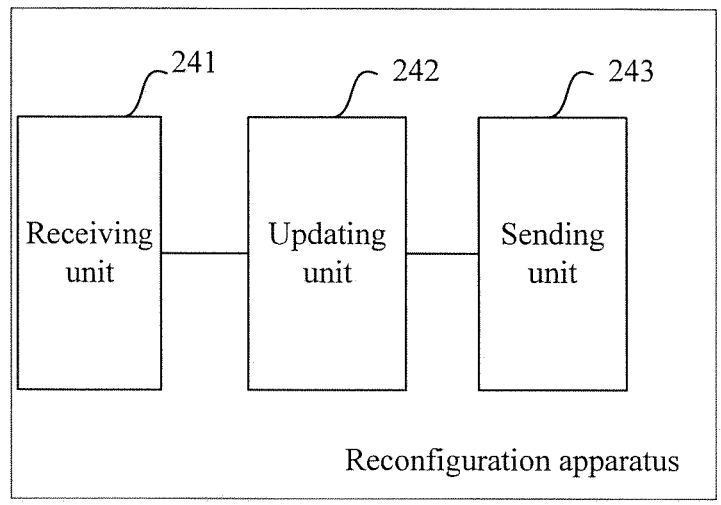
FIG. 24 is a schematic diagram of a reconfiguration apparatus according to Embodiment 24 of the present invention.

FIG. 24 is a schematic diagram of a reconfiguration apparatus according to Embodiment 24 of the present invention. This apparatus is configured to execute the reconfiguration method provided by any embodiment of Embodiment 11, Embodiment 12, and Embodiment 13 of the present invention. As shown in the figure, the embodiment of the present invention specifically includes: a receiving unit 241, an updating unit 242, and a sending unit 243.

The receiving unit 241 is configured to receive reconfiguration information that is sent by a primary base station and carries an encryption algorithm, and transmit the reconfiguration information carrying the encryption algorithm to the updating unit 242, where the encryption algorithm is an encryption algorithm that is determined by the primary base station according to a security capability of a terminal.

The updating unit 242 is configured to receive the reconfiguration information carrying the encryption algorithm from the receiving unit 241, update a local key according to the encryption algorithm in the reconfiguration information and use the encryption algorithm and the updated key to communicate with a secondary base station, and transmit updated key information to the sending unit 243.

The sending unit 243 is configured to receive the updated key information from the updating unit 242, and send reconfiguration complete information to the primary base station, so that the primary base station knows, according to the reconfiguration complete information, information that the primary base station completes a reconfiguration.

Therefore, by using the foregoing reconfiguration apparatuses provided by Embodiment 23 and Embodiment 24 of the present invention, a primary base station determines an encryption algorithm used by a secondary base station and a terminal, and sends the encryption algorithm to the secondary base station and the terminal respectively; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

Figure 25:
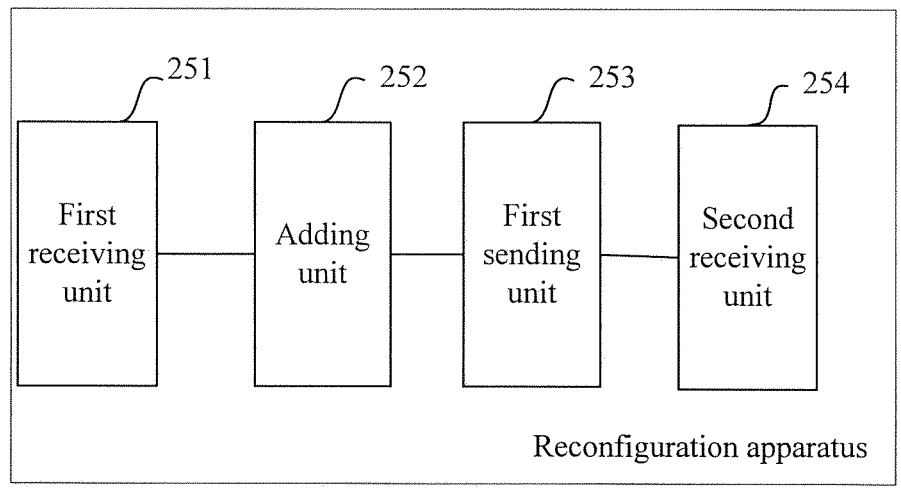
FIG. 25 is a schematic diagram of a reconfiguration apparatus according to Embodiment 25 of the present invention.

FIG. 25 is a schematic diagram of a reconfiguration apparatus according to Embodiment 25 of the present invention. This apparatus is configured to execute the reconfiguration method provided by any embodiment of Embodiment 14, and Embodiment 16 to Embodiment 18 of the present invention. As shown in the figure, the embodiment of the present invention specifically includes: a first receiving unit 251, an adding unit 252, a first sending unit 253, and a second receiving unit 254.

The first receiving unit 251 is configured to receive security parameter update request information that is sent by a secondary base station and carries an encryption algorithm, and transmit the security parameter update request information carrying the encryption algorithm to the adding unit 252, where the security parameter update request information includes the encryption algorithm, or the encryption algorithm and security parameter update request cause information. The security parameter update request cause information includes that a count value maintained by the secondary base station overflows or that a counter check result is inconsistent.

The adding unit 252 is configured to add the encryption algorithm in the received security parameter update request information to reconfiguration information.

The first sending unit 253 is configured to receive the reconfiguration information carrying the encryption algorithm from the adding unit 252, and send the reconfiguration information carrying the encryption algorithm to a terminal, so that the terminal updates a key of the terminal itself according to the encryption algorithm in the reconfiguration information and communicates with the secondary base station by using the encryption algorithm and the updated key.

The second receiving unit 254 is configured to receive reconfiguration complete information sent by the terminal.

Further, the reconfiguration apparatus provided by Embodiment 25 of the present invention further includes:

a second sending unit, configured to send security capability information of the terminal to the secondary base station, so that the secondary base station determines the encryption algorithm according to the security capability information of the terminal; and a third receiving unit, configured to receive security parameter update request cause information sent by the secondary base station when the security parameter update request information received from the first receiving unit 251 includes only the encryption algorithm, and transmit the security parameter update request cause information to the second sending unit. The security parameter update request cause information is that a count value maintained by the secondary base station overflows or that a count value maintained by the secondary base station is incorrect. When the count value maintained by the secondary base station is different from a count value maintained by the terminal itself and corresponding to the count value, it is considered that the count value maintained by the secondary base station is incorrect.

Figure 26:
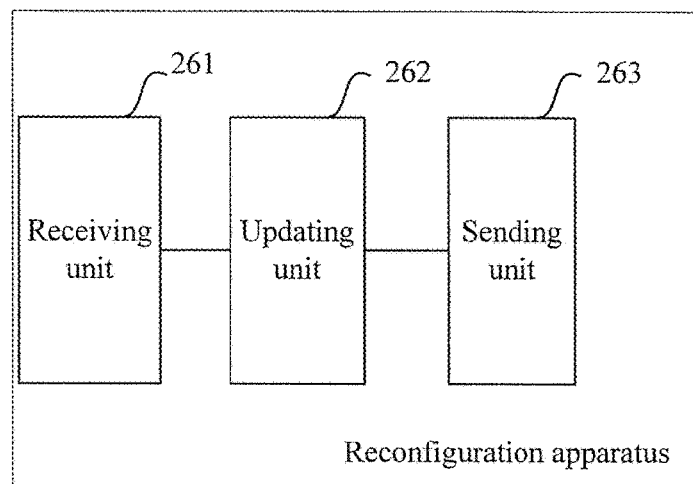
FIG. 26 is a schematic diagram of a reconfiguration apparatus according to Embodiment 26 of the present invention.

FIG. 26 is a schematic diagram of a reconfiguration apparatus according to Embodiment 26 of the present invention. This apparatus is configured to execute the reconfiguration method provided by any embodiment of Embodiment 15 and Embodiment 16 to Embodiment 18 of the present invention. As shown in the figure, the embodiment of the present invention specifically includes: a receiving unit 261, an updating unit 262, and a sending unit 263.

The receiving unit 261 is configured to receive reconfiguration information that is sent by a primary base station and carries an encryption algorithm of a secondary base station, and transmit the reconfiguration information carrying the encryption algorithm to the updating unit 262. The encryption algorithm is an encryption algorithm obtained by the primary base station from security parameter update request information sent by the secondary base station.

The updating unit 262 is configured to receive the reconfiguration information carrying the encryption algorithm from the receiving unit 261, update a local key according to the encryption algorithm in the reconfiguration information and communicate with the secondary base station by using the encryption algorithm and the updated key, and transmit updated key information to the sending unit 263.

The sending unit 263 is configured to receive the updated key information from the updating unit 262, and send reconfiguration complete information to the primary base station, so that the primary base station knows, according to the reconfiguration complete information, information that the primary base station completes a reconfiguration.

Therefore, by using the foregoing reconfiguration apparatuses provided by Embodiment 25 and Embodiment 26 of the present invention, a secondary base station determines an encryption algorithm used by the secondary base station itself and a terminal, and sends the encryption algorithm to a primary base station; the primary base station then sends the encryption algorithm to the terminal; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

An embodiment of the present invention provides a counter check and reconfiguration system, where the system includes: the counter check apparatus provided by any one of Embodiments 19 to 22, the reconfiguration apparatus provided by any one of Embodiments 23 to 26, and a secondary base station related to the counter check apparatus and the reconfiguration apparatus.

Figure 27:
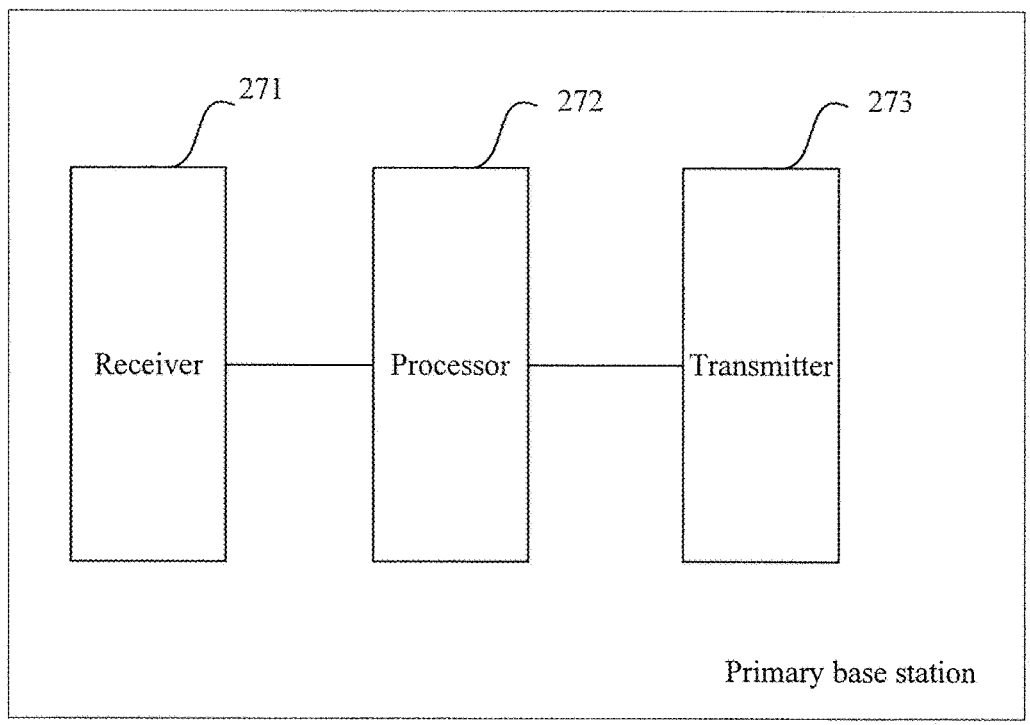
FIG. 27 is a schematic structural diagram of a primary base station according to Embodiment 27 of the present invention.

FIG. 27 is a schematic structural diagram of a primary base station according to Embodiment 27 of the present invention. This primary base station is configured to execute the counter check method provided by any embodiment of Embodiment 2, Embodiment 4, Embodiment 5, and Embodiment 6 of the present invention. As shown in the figure, the embodiment of the present invention specifically includes: a receiver 271, a processor 272, and a transmitter 273.

The receiver 271 is configured to receive first identity information and first count information sent by a secondary base station, and transmit the first identity information and the first count information to the processor 272; and further configured to receive first comparison result information, or second identity information and second comparison result information sent by a terminal, and transmit the first identity information and the first count information, the first comparison result information, or the second identity information and second comparison result information to the processor 272.

The processor 272 is configured to receive the first identity information and the first count information from the receiver 271, query, according to the first identity information, second identity information corresponding to the first identity information, and/or extract second count information from the first count information, and transmit the second identity information and the second count information to the transmitter 273; and further configured to receive the first comparison result information, or the second identity information and second comparison result information from the receiver, and determine counter check result information according to the received first comparison result information, or the received second identity information and second comparison result information. The first identity information includes an identity of the terminal and a radio access bearer E-RAB identity of the terminal; the first count information includes a first uplink count value and a first downlink count value of the E-RAB identity of the terminal, or first n bits of a first uplink count value and first n bits of a first downlink count value of the E-RAB identity of the terminal.

Specifically, the extracting second count information from the first count information, is specifically: extracting first several bits from the first uplink count value for use as a second uplink count value, and extracting first several bits from the first downlink count value for use as a second downlink count value, where the second uplink count value and the second downlink count value constitute the second count information. In addition, first m bits may also be extracted from first n bits of the first uplink count value for use as a second uplink count value, and simultaneously first m bits are extracted from first n bits of the first downlink count value for use as a second downlink count value, where m is less than or equal to n. In this case, the second uplink count value and the second downlink count value constitute the second count information.

The transmitter 273 is configured to receive the second identity information and the second count information from the processor 272, and send the second identity information and the second count information to the terminal, so that the terminal compares, according to the second identity information, the second count information with third count information maintained by the terminal itself to obtain the first comparison result information or the second comparison result information.

That the terminal compares, according to the second identity information, the second count information with third count information maintained by the terminal itself to obtain the first comparison result information or the second comparison result information, is specifically that: according to the second identity information, the terminal makes a first comparison between the second uplink count value and a third uplink count value that is maintained by the terminal itself and corresponding to the second identity information, and meanwhile makes a second comparison between the second downlink count value and a third downlink count value that is maintained by the terminal itself and corresponding to the second identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the third count information maintained by the terminal itself, and the third count information maintained by the terminal itself includes the third uplink count value and the third downlink count value.

The determining counter check result information according to the received first comparison result information, or the received second identity information and second comparison result information, is specifically: when the first comparison result information is received, determining that the counter check result information is that the first count information is consistent with the third count information; when the second comparison result information is received, determining that the counter check result information is that the first count information is inconsistent with the third count information.

Preferably, the transmitter 273 is further configured to send count transmission request information, so that the secondary base station determines the first count information according to the count transmission request information. The count transmission request information includes the identity of the terminal and the E-RAB identity of the terminal.

Preferably, the transmitter 273 is further configured to receive the first identity information, and the first comparison result information or second comparison result information from the receiver, and send the first comparison result information, or the first identity information and second comparison result information to the secondary base station, so that the secondary base station determines counter check result information according to the received first comparison result information or second comparison result information.

Figure 28:
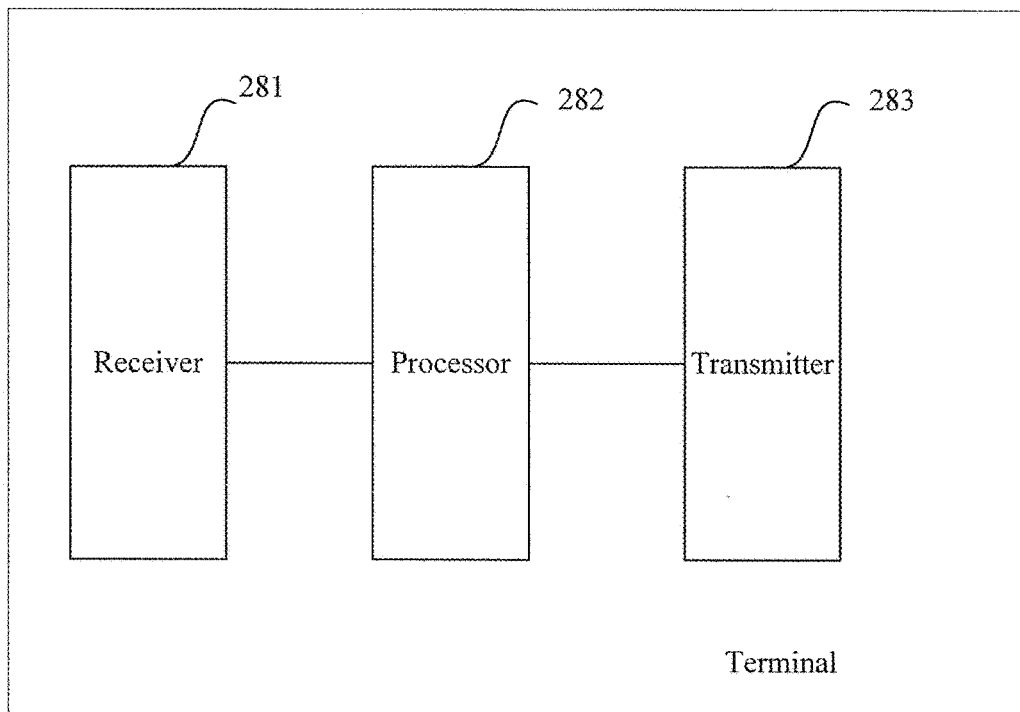
FIG. 28 is a schematic structural diagram of a terminal according to Embodiment 28 of the present invention.

FIG. 28 is a schematic structural diagram of a terminal according to Embodiment 28 of the present invention. This terminal is configured to execute the counter check method provided by any embodiment of Embodiment 3, Embodiment 4, Embodiment 5, and Embodiment 6 of the present invention. As shown in the figure, the embodiment of the present invention specifically includes: a receiver 281, a processor 282, and a transmitter 283.

The receiver 281 is configured to receive second identity information corresponding to first identity information and second count information extracted from first count information, which are sent by a primary base station, transmit the second identity information to a comparing unit and a sending unit, and transmit the second count information to the processor 282. The first identity information includes an identity of the terminal and a radio access bearer E-RAB identity of the terminal; the first count information includes a first uplink count value and a first downlink count value of the E-RAB identity of the terminal.

Specifically, the sending, by a primary base station, second identity information corresponding to first identity information and second count information extracted from first count information, is specifically: querying, by the primary base station according to the identity of the terminal and the radio access bearer E-RAB identity of the terminal, a DRB identity of the terminal and corresponding to the E-RAB identity, where the DRB identity is the second identity information; and extracting first several bits from the first uplink count value for use as a second uplink count value, and extracting first several bits from the first downlink count value for use as a second downlink count value, where the second uplink count value and the second downlink count value constitute the second count information.

The processor 282 is configured to receive the second identity information and the second count information from the receiver 281, and compare, according to the second identity information, the second count information with third count information maintained locally to obtain first comparison result information or second comparison result information, and transmit the first comparison result information or the second comparison result information to the transmitter 283.

Specifically, the comparing, according to the second identity information, the second count information with third count information maintained locally to obtain first comparison result information or second comparison result information, is specifically:

according to the second identity information, making a first comparison between the second uplink count value and a third uplink count value that is maintained locally and corresponding to the second identity information, and meanwhile making a second comparison between the second downlink count value and a third downlink count value that is maintained locally and corresponding to the second identity information; when a comparison result of the first comparison is same, and a comparison result of the second comparison is also same, obtaining the first comparison result information; when a comparison result of the first comparison is different, and/or a comparison result of the second comparison is different, obtaining the second comparison result information; the first comparison result information is null information, the second comparison result information is the third count information maintained locally, and the third count information maintained locally includes the third uplink count value and the third downlink count value.

The transmitter 283 is configured to receive the second identity information from the receiver, and receive the first comparison result information or the second comparison result information from the comparing unit, and send the first comparison result information, or the second identity information and second comparison result information to the primary base station, so that the primary base station determines counter check result information according to the first comparison result information or the second comparison result information.

The determining counter check result information according to the first comparison result information or the second comparison result information, is specifically: when the first comparison result information is received, determining that the counter check result information is that the first count information is consistent with the third count information; when the second comparison result information is received, determining that the counter check result information is that the first count information is inconsistent with the third count information.

Therefore, by using the foregoing primary base station provided by Embodiment 27 and the terminal provided by Embodiment 28 of the present invention, the primary base station receives first identity information and first count information from a secondary base station, and converts the first identity information into second identity information, and meanwhile extracts second count information from the first count information and sends the second count information to the terminal, so that the terminal makes a comparison with third count information maintained by the terminal itself and feeds back first comparison information or second comparison information to the primary base station; the primary base station determines a counter check result, thereby implementing a counter check process in a network architecture in which a primary base station is separated from a secondary base station.

Figure 29:
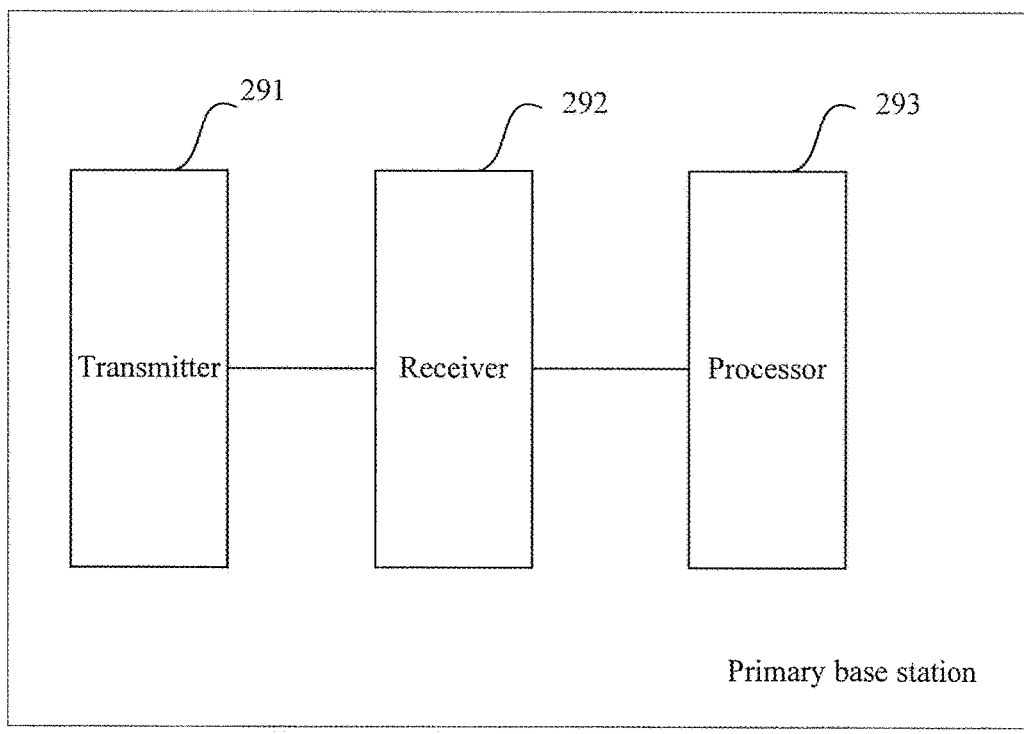
FIG. 29 is a schematic structural diagram of a primary base station according to Embodiment 29 of the present invention.

FIG. 29 is a schematic structural diagram of a primary base station according to Embodiment 29 of the present invention. This primary base station is configured to execute the counter check method provided by either embodiment of Embodiment 7 and Embodiment 9 of the present invention. As shown in the figure, the embodiment of the present invention specifically includes: a transmitter 291, a receiver 292, and a processor 293.

The transmitter 291 is configured to send first identity information, or first identity information and first count information to a terminal, so that the terminal queries, according to the first identity information, second count information maintained by the terminal itself, or compares, according to the first identity information, the first count information with second count information maintained by the terminal itself to obtain first comparison result information or second comparison result information; and further configured to receive second identity information from the processor 293, and the second count information, or the first comparison result information, or the second comparison result information, and send the second identity information and the second count information, or the first comparison result information, or the second identity information and the second comparison result information to a secondary base station, so that the secondary base station obtains the second count information maintained by the terminal itself and compares the second count information with third count information maintained by the secondary base station itself, thereby determining counter check result information. The first identity information is a DRB identity of the terminal; the first count information is a preset count value; the second identity information is identity information of the terminal and an E-RAB identity of the terminal. The first count information includes a first uplink count value and a first downlink count value.

Specifically, that the terminal compares, according to the first identity information, the first count information with second count information maintained by the terminal itself to obtain first comparison result information or second comparison result information, is specifically that: according to the first identity information, the terminal makes a first comparison between the first uplink count value and a second uplink count value that is maintained by the terminal itself and corresponding to the first identity information, and/or makes a second comparison between the first downlink count value and a second downlink count value that is maintained by the terminal itself and corresponding to the first identity information; when a comparison result of the first comparison is same, and a comparison result of the second comparison is same, obtains the first comparison result information; when a comparison result of the first comparison is different, and/or a comparison result of the second comparison is different, obtains the second comparison result information; the first comparison result information is null information, the second comparison result information is the second count information maintained by the terminal itself, and the second count information maintained by the terminal itself includes the second uplink count value and the second downlink count value.

The receiver 292 is configured to receive the first identity information and the second count information sent by the terminal, or the first comparison result information sent by the terminal, or the first identity information and second comparison result information sent by the terminal, and transmit the first identity information to the processor, and transmit the second count information, or the first comparison result information, or the second comparison result information to the transmitter 291.

The processor 293 is configured to receive the first identity information from the receiver, query, according to the first identity information, the second identity information corresponding to the first identity information, and transmit the second identity information to the transmitter 291.

Figure 30:
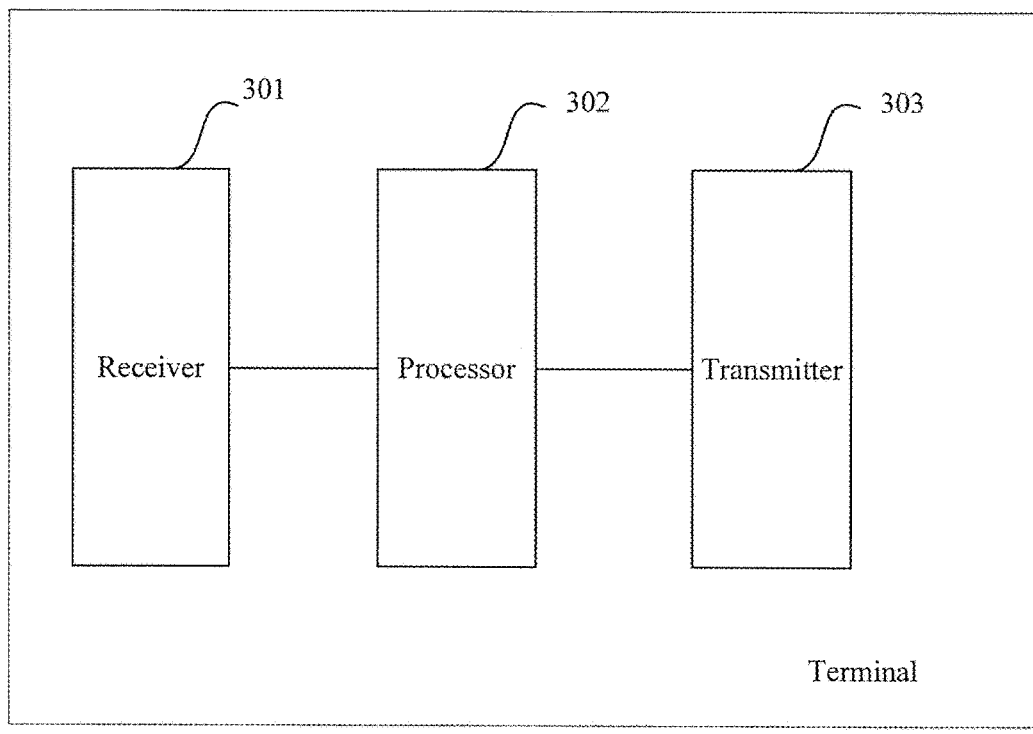
FIG. 30 is a schematic structural diagram of a terminal according to Embodiment 30 of the present invention.

FIG. 30 is a schematic structural diagram of a terminal according to Embodiment 30 of the present invention. This terminal is configured to execute the counter check method provided by either embodiment of Embodiment 8 and Embodiment 9 of the present invention. As shown in the figure, the embodiment of the present invention specifically includes: a receiver 301, a processor 302, and a transmitter 303.

The receiver 301 is configured to receive first identity information, or first identity information and first count information sent by a primary base station, and transmit the first identity information to the processor and the transmitter, and transmit the first count information to the processor 302. The first identity information is a DRB identity of the terminal, and the first count information is a preset count value.

The processor 302 is configured to receive the first identity information, or the first identity information and the first count information from the receiver 301, query, according to the first identity information, second count information maintained locally, or compare, according to the first identity information, the first count information with second count information maintained locally to obtain first comparison result information or second comparison result information, and transmit the second count information, or the first comparison result information, or the second comparison result information to the transmitter 303. The first count information includes a first uplink count value and a first downlink count value.

Specifically, according to the first identity information, a first comparison is made between the first uplink count value and a second uplink count value that is maintained by the terminal itself and corresponding to the first identity information, and/or a second comparison is made between the first downlink count value and a second downlink count value that is maintained by the terminal itself and corresponding to the first identity information; when a comparison result of the first comparison is same, and a comparison result of the second comparison is same, the first comparison result information is obtained; when a comparison result of the first comparison is different, and/or a comparison result of the second comparison is different, the second comparison result information is obtained; the first comparison result information is null information, the second comparison result information is the second count information maintained by the terminal itself, and the second count information maintained by the terminal itself includes the second uplink count value and the second downlink count value.

The transmitter 303 is configured to receive the first identity information from the receiver 301, and receive the second count information, or the first comparison result information, or the second comparison result information from the processor 302, and send the first identity information and the second count information, or the first comparison result information, or the first identity information and second comparison result information to the primary base station, so that the primary base station forwards the second count information, or the first comparison result information and the second comparison result information to a secondary base station, so that the secondary base station determines counter check result information according to the second count information, or the first comparison result information, or the second comparison result information, and obtains the second count information maintained by the terminal itself.

Therefore, by using the foregoing primary base station provided by Embodiment 29 and terminal provided by Embodiment 30 of the present invention, the primary base station presets first count information to a random value, and sends first identity information and the preset first count information to the terminal, so that the terminal makes a comparison with second count information maintained by the terminal itself and feeds back first comparison information or second comparison information to the primary base station; the primary base station then forwards the first comparison information or second comparison information to a secondary base station, so that the secondary base station determines a counter check result and obtains the second count information maintained by the terminal itself, thereby implementing a counter check process in a network architecture in which a primary base station is separated from a secondary base station.

Figure 31:
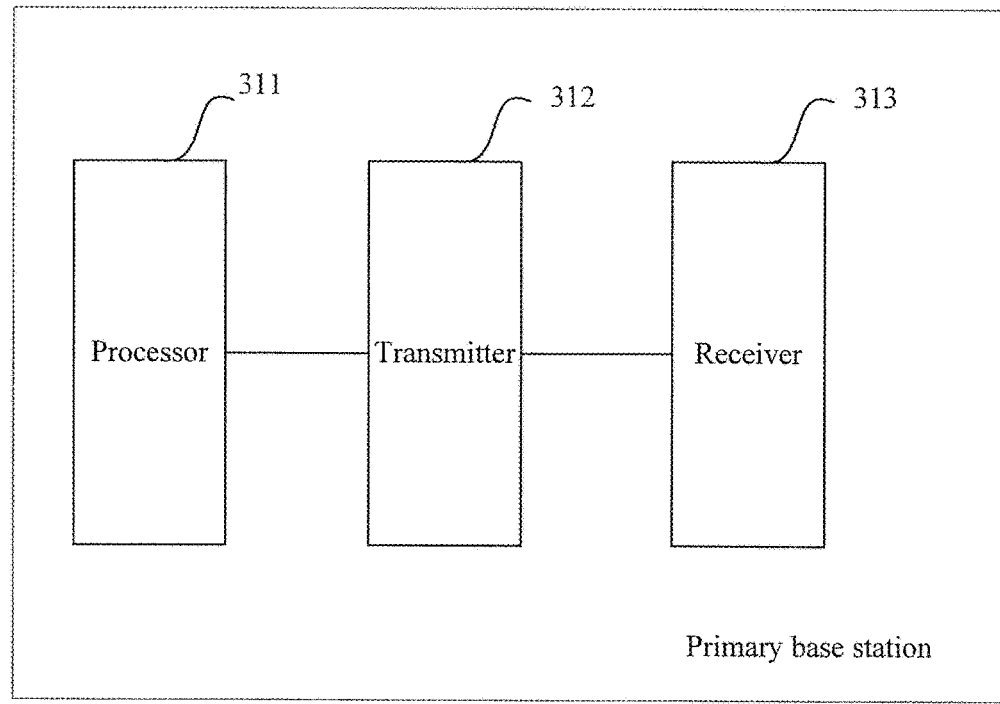
FIG. 31 is a schematic structural diagram of a primary base station according to Embodiment 31 of the present invention.

FIG. 31 is a schematic structural diagram of a primary base station according to Embodiment 31 of the present invention. This primary base station is configured to execute the reconfiguration method provided by any embodiment of Embodiment 10, Embodiment 12, and Embodiment 13 of the present invention. As shown in the figure, the embodiment of the present invention specifically includes: a processor 311, a transmitter 312, and a receiver 313.

The processor 311 is configured to determine an encryption algorithm according to a security capability of a terminal, and transmit the encryption algorithm to the transmitter 312.

The transmitter 312 is configured to receive the encryption algorithm from the processor 311, and send reconfiguration information carrying the encryption algorithm to the terminal, so that the terminal updates a key of the terminal itself according to the encryption algorithm in the reconfiguration information and communicates with a secondary base station by using the encryption algorithm and the updated key.

The receiver 313 is configured to receive reconfiguration complete information sent by the terminal.

Preferably, the transmitter 312 is further configured to receive the encryption algorithm from the processor 311, and send security parameter update information carrying the encryption algorithm to the secondary base station, so that the secondary base station communicates with the terminal by using the encryption algorithm in the security parameter update information.

The receiver 313 is further configured to receive security parameter update request information sent by the secondary base station, and transmit the security parameter update request information to the processor 311, so that the processor 311 determines the encryption algorithm according to the security capability of the terminal after the security parameter update request information is received. The security parameter update request information includes that a count value maintained by the secondary base station overflows or that a counter check result is inconsistent.

Figure 32:
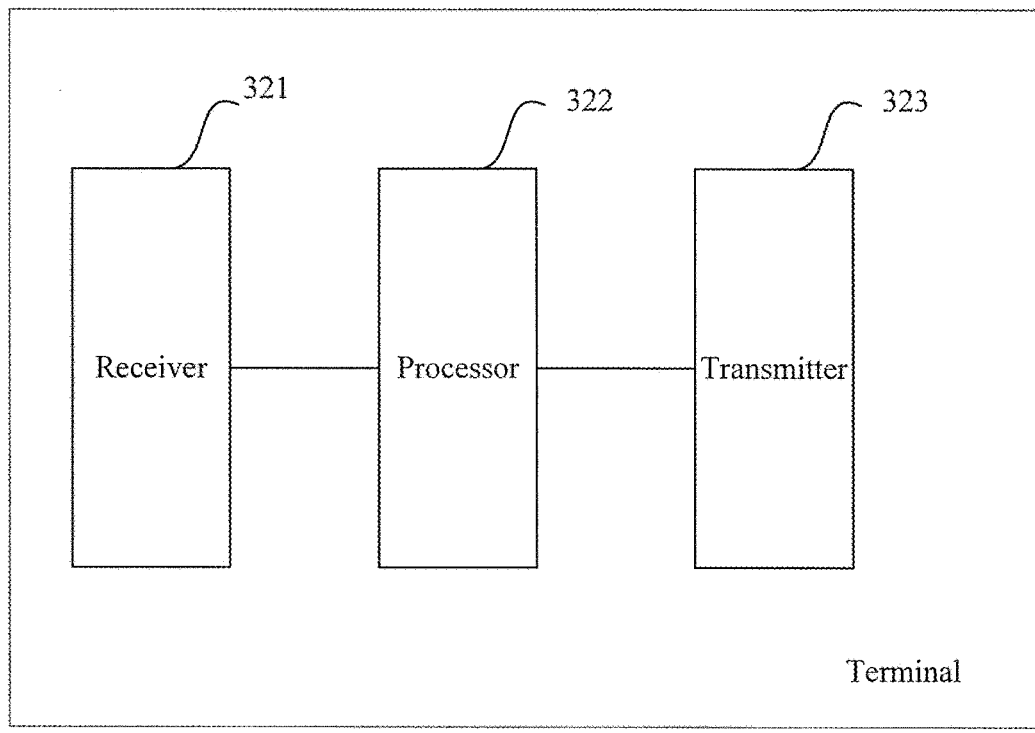
FIG. 32 is a schematic structural diagram of a terminal according to Embodiment 32 of the present invention.

FIG. 32 is a schematic structural diagram of a terminal according to Embodiment 32 of the present invention. This terminal is configured to execute the reconfiguration method provided by any embodiment of Embodiment 11, Embodiment 12, and Embodiment 13 of the present invention. As shown in the figure, the embodiment of the present invention specifically includes: a receiver 321, a processor 322, and a transmitter 323.

The receiver 321 is configured to receive reconfiguration information that is sent by a primary base station and carries an encryption algorithm, and transmit the reconfiguration information carrying the encryption algorithm to the processor 322.

The processor 322 is configured to receive the reconfiguration information carrying the encryption algorithm from the receiver, update a local key according to the encryption algorithm in the reconfiguration information and communicate with a secondary base station by using the encryption algorithm and the updated key, and transmit the updated key information to the transmitter 323.

The transmitter 323 is configured to receive the updated key information from the processor 322, and send reconfiguration complete information to the primary base station, so that the primary base station knows, according to the reconfiguration complete information, information that the primary base station completes a reconfiguration.

Therefore, by using the foregoing primary base station provided by Embodiment 31 and terminal provided by Embodiment 32 of the present invention, the primary base station determines an encryption algorithm used by a secondary base station and the terminal, and sends the encryption algorithm to the secondary base station and the terminal respectively; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

Figure 33:
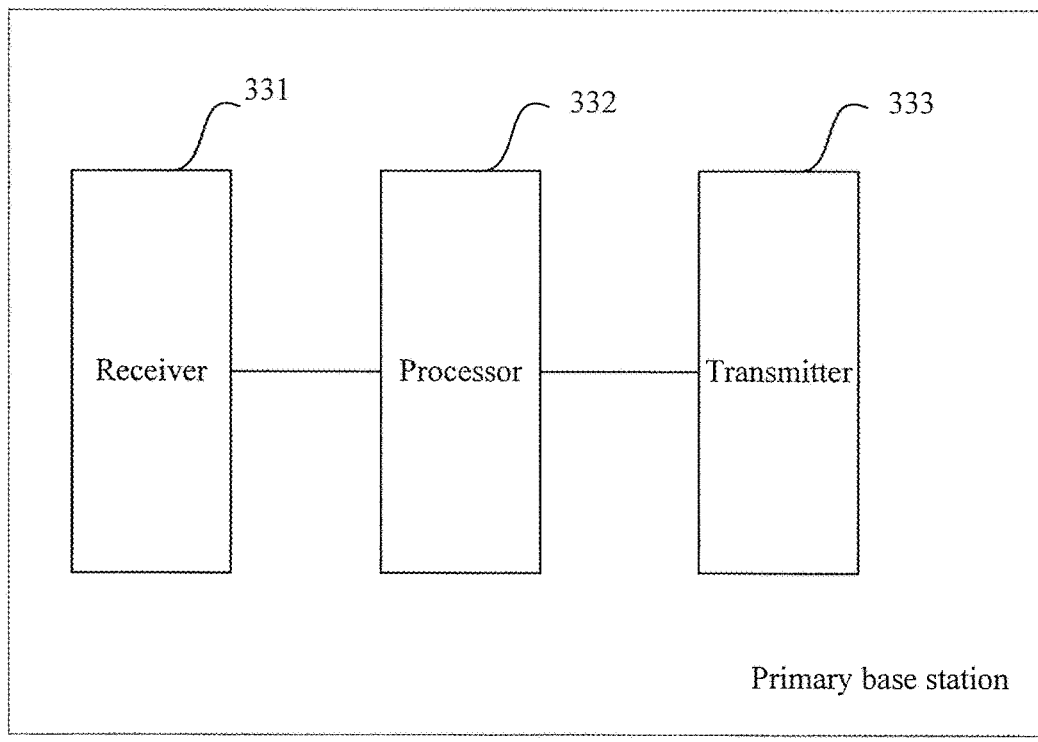
FIG. 33 is a schematic structural diagram of a primary base station according to Embodiment 33 of the present invention.

FIG. 33 is a schematic structural diagram of a primary base station according to Embodiment 33 of the present invention. This primary base station is configured to execute the reconfiguration method provided by any embodiment of Embodiment 14, and Embodiment 16 to Embodiment 18 of the present invention. As shown in the figure, the embodiment of the present invention specifically includes: a receiver 331, a processor 332, and a transmitter 333.

The receiver 331 is configured to receive security parameter update request information that is sent by a secondary base station and carries an encryption algorithm, and transmit the security parameter update request information carrying the encryption algorithm to the processor 332; and further configured to receive reconfiguration complete information sent by a terminal, where the security parameter update request information includes the encryption algorithm, or the encryption algorithm and security parameter update request cause information.

The processor is configured to receive the security parameter update request information carrying the encryption algorithm from the receiver 331, add the encryption algorithm in the received security parameter update request information to reconfiguration information, and transmit the reconfiguration information to the transmitter 333.

The transmitter 333 is configured to receive the reconfiguration information carrying the encryption algorithm from the processor 332, and send the reconfiguration information carrying the encryption algorithm to the terminal, so that the terminal updates a key of the terminal itself according to the encryption algorithm in the reconfiguration information and communicates with the secondary base station by using the updated key.

Preferably, the primary base station provided by the embodiment of the present invention further includes: the transmitter 333, configured to send security capability information of the terminal to the secondary base station, so that the secondary base station determines the encryption algorithm according to the security capability information of the terminal.

Preferably, the receiver 331 is further configured to receive security parameter update request cause information sent by the secondary base station when the received security parameter update request information carries only the encryption algorithm, and transmit the security parameter update request cause information to the transmitter. The security parameter update request cause information is that a count value maintained by the secondary base station overflows or that a count value maintained by the secondary base station is incorrect. When the count value maintained by the secondary base station is different from a count value maintained by the terminal itself and corresponding to the count value, it is considered that the count value maintained by the secondary base station is incorrect.

Figure 34:
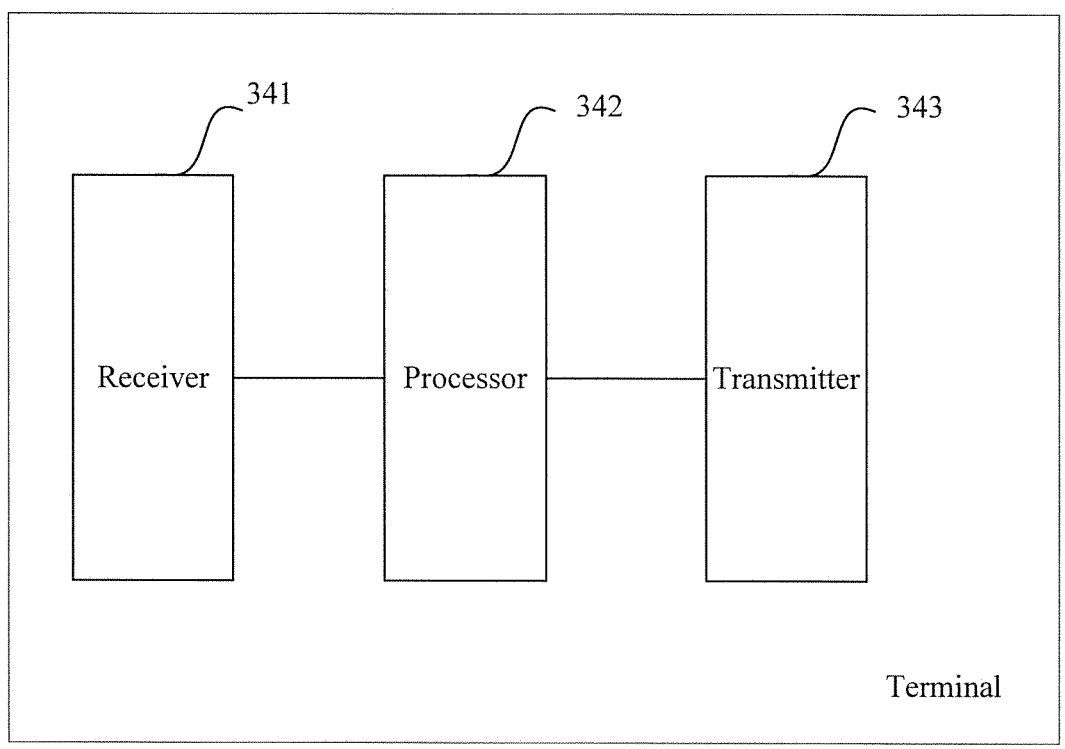
FIG. 34 is a schematic structural diagram of a terminal according to Embodiment 34 of the present invention.

FIG. 34 is a schematic structural diagram of a terminal according to Embodiment 34 of the present invention. This terminal is configured to execute the reconfiguration method provided by any embodiment of Embodiment 15 and Embodiment 16 to Embodiment 18 of the present invention.

As shown in the figure, the embodiment of the present invention specifically includes: a receiver 341, a processor 342, and a transmitter 343.

The receiver 341 is configured to receive reconfiguration information that is sent by a primary base station and carries an encryption algorithm of a secondary base station, and transmit the reconfiguration information carrying the encryption algorithm to the processor 342. The encryption algorithm is an encryption algorithm obtained by the primary base station from security parameter update request information sent by the secondary base station.

The processor 342 is configured to receive the reconfiguration information carrying the encryption algorithm from the receiver 341, update a local key according to the encryption algorithm in the reconfiguration information and communicate with the secondary base station by using the encryption algorithm and the updated key, and transmit the updated key information to the transmitter 343.

The transmitter 343 is configured to receive the updated key information from the processor 342, and send reconfiguration complete information to the primary base station, so that the primary base station knows, according to the reconfiguration complete information, information that the primary base station completes a reconfiguration.

Therefore, by using the foregoing primary base station provided by Embodiment 33 and terminal provided by Embodiment 34 of the present invention, a secondary base station determines an encryption algorithm used by the secondary base station and the terminal, and sends the encryption algorithm to the primary base station; the primary base station then sends the encryption algorithm to the terminal; the terminal sends reconfiguration complete information to the primary base station after updating a key by using the encryption algorithm, so that the secondary base station performs secure communication with the terminal by using the encryption algorithm and the updated key, thereby implementing a reconfiguration process in a network architecture in which a primary base station is separated from a secondary base station.

An embodiment of the present invention provides a counter check and reconfiguration system, where the system includes: the primary base station provided by Embodiment 27 of the present invention, the terminal provided by Embodiment 28 of the present invention, and a secondary base station that performs information interaction with the primary base station; or the primary base station provided by Embodiment 29 of the present invention, the terminal provided by Embodiment 30 of the present invention, and a secondary base station that performs information interaction with the primary base station; or the primary base station provided by Embodiment 31 of the present invention, the terminal provided by Embodiment 32 of the present invention, and a secondary base station that performs information interaction with the primary base station; or the primary base station provided by Embodiment 33 of the present invention, the terminal provided by Embodiment 34 of the present invention, and a secondary base station that performs information interaction with the primary base station.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A primary base station, comprising:
   a processor;
   a transmitter; and
   a receiver, the receiver configured to:
   receive security parameter update request information that carries an encryption algorithm from a secondary base station,
   transmit the security parameter update request information carrying the encryption algorithm to the processor,
   receive reconfiguration complete information sent by a terminal, wherein the security parameter update request information comprises the encryption algorithm, and
   receive security parameter update request cause information from the secondary base station, wherein the security parameter update request cause information comprises a count value that overflows, the count value maintained by the secondary base station;
   the processor configured to:
   receive the security parameter update request information carrying the encryption algorithm from the receiver,
   add the encryption algorithm in the received security parameter update request information to reconfiguration information, and
   transmit the reconfiguration information to the transmitter; and
   the transmitter configured to:
   receive the reconfiguration information carrying the encryption algorithm from the processor,
   send the reconfiguration information carrying the encryption algorithm to the terminal, and
   send security capability information of the terminal to the secondary base station, the security capability information of the terminal is used to determine the encryption algorithm.

2. A system comprising:
   a primary base station configured to:
   receive security parameter update request information that is sent by a secondary base station, wherein the security parameter update request information comprises an encryption algorithm, receive security parameter update request cause information, add the encryption algorithm in the received security parameter update request information to reconfiguration information, send the reconfiguration information carrying the encryption algorithm to a terminal, and receive reconfiguration complete information sent by the terminal, and send security capability information of the terminal to the secondary base station; and wherein the secondary base station is configured to:

determine an encryption algorithm used by the secondary base station and the terminal, send security parameter update request information to the primary base station, wherein the security parameter update request information comprises the encryption algorithm, receive the security capability information of the terminal, and determine the encryption algorithm according to the security capability information of the terminal, send security parameter update request cause information to the primary base station, wherein the security parameter update request cause information comprises that a count value maintained by the secondary base station overflows, and communicate with the terminal by using an updated key, the updated key is updated based on the encryption algorithm.

3. The primary base station according to claim 1, wherein the encryption algorithm in the reconfiguration information is used to update a key of the terminal.

* * * * *